(12) United States Patent
Frenne et al.

(10) Patent No.: US 9,161,344 B2
(45) Date of Patent: Oct. 13, 2015

(54) AGGREGATION OF RESOURCES IN ENHANCED CONTROL CHANNELS

(71) Applicant: Telefonaktiebolaget L M Ericsson (publ), Stockholm (SE)

(72) Inventors: Mattias Frenne, Uppsala (SE); Jung-Fu Cheng, Fremont, CA (US); Johan Furuskog, Stockholm (SE); Havish Koorapaty, Saratoga, CA (US); Daniel Larsson, Vallentuna (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 84 days.

(21) Appl. No.: 13/885,704

(22) PCT Filed: Mar. 19, 2013

(86) PCT No.: PCT/SE2013/050300
§ 371 (c)(1),
(2) Date: Jun. 12, 2013

(87) PCT Pub. No.: WO2013/141801
PCT Pub. Date: Sep. 26, 2013

(65) Prior Publication Data
US 2014/0071934 A1    Mar. 13, 2014

Related U.S. Application Data

(60) Provisional application No. 61/612,803, filed on Mar. 19, 2012.

(51) Int. Cl.
*H04L 5/00* (2006.01)
*H04L 1/00* (2006.01)
(Continued)

(52) U.S. Cl.
CPC ......... *H04W 72/0406* (2013.01); *H04L 1/0068* (2013.01); *H04L 1/0069* (2013.01);
(Continued)

(58) Field of Classification Search
None
See application file for complete search history.

(56) References Cited

U.S. PATENT DOCUMENTS 7,088,671 B1    8/2006  Monsen
2011/0310856 A1*  12/2011  Hariharan et al. ............ 370/336
(Continued)

OTHER PUBLICATIONS

Author Unknown, EPDCCH search space design to support narrow band operation, Doc. No. R1-120764, Feb. 10, 2012, pp. 1-2.*
(Continued)

*Primary Examiner* — Christopher Crutchfield
(74) *Attorney, Agent, or Firm* — Murphy, Bilak & Homiller, PLLC

(57) ABSTRACT

The set of resource aggregation levels available for forming an enhanced control channel message may vary from one subframe to another, based on the level of puncturing in the transmitted subframes. An example method begins with determining (2710) members of a set of aggregation levels usable to aggregate the non-overlapping subsets of resource elements for transmitting downlink control information. This determining is based on a puncturing level to be used for the transmission of the downlink control information. Downlink control information for the given subframe is mapped (2720) to one or more non-overlapping subsets of resource elements in the at least one block of time-frequency resources, according to an aggregation level selected from the determined set, and then transmitted (2730), in the one or more non-overlapping subsets. This method may be repeated for each of several subframes, where the puncturing may differ from one subframe to another.

21 Claims, 15 Drawing Sheets

(51) Int. Cl.
*H04W 72/04* (2009.01)
*H04B 7/04* (2006.01)

(52) U.S. Cl.
CPC ............. *H04L 5/001* (2013.01); *H04L 5/0023* (2013.01); *H04L 5/0037* (2013.01); *H04L 5/0053* (2013.01); *H04B 7/0413* (2013.01); *H04L 5/0051* (2013.01)

(56) References Cited

U.S. PATENT DOCUMENTS

| | | | | |
|---|---|---|---|---|
| 2012/0009923 | A1* | 1/2012 | Chen et al. | 455/434 |
| 2012/0176884 | A1* | 7/2012 | Zhang et al. | 370/203 |
| 2013/0039284 | A1 | 2/2013 | Marinier et al. | |
| 2013/0039285 | A1* | 2/2013 | Sorrentino | 370/329 |
| 2013/0083750 | A1 | 4/2013 | Nazar et al. | |
| 2013/0114522 | A1 | 5/2013 | Frenne et al. | |
| 2013/0188569 | A1* | 7/2013 | He et al. | 370/329 |

OTHER PUBLICATIONS

Author Unknown, On reference signal design for enhanced control channels, Doc. No. R1-120076 pp. 1-4, Feb. 10, 2012, pp. 1-4.*
Author Unknown, Comparison between puncturing and rate-matching for ePDCCH, Doc. No. R1-121962, May 25, 2012, pp. 1-6.*
Author Unknown, eCCE definition for ePDCCH, Doc. No. R1-121963, May 25, 2012, pp. 1-4.*
3rd Generation Partnership Project. 3GPP TS 36.211 V10.0.0 (Dec. 2010). 3rd Generation Partnership Project; Technical Specification Group Radio Access Network; Evolved Universal Terrestrial Radio Access (E-UTRA); Physical channels and modulation (Release 10). Dec. 2010, pp. 1-103.
Dahlman, Erik et al. 4G LTE/LTE-Advanced for Mobile Broadband. Chapter 10. Academic Press. Oxford. 2011. pp. 145-202.
Unknown, Author. "Discussions on Backhaul Reference Signal Design." Nokia Siemens Networks. #GPP TSG-RAN WG1 Meeting #61. May 10-14, 2010. R1-102968. Montreal, Canada.
Unknown, Author. "Search Space Design and RE Mapping for the Non-interleaved R-PDCCH transmission with CRS and DMRS." NEC Group. TSG-RAN WG1 #62. Aug. 23-27, 2010. R1-104534. Madrid, Spain.
Unknown, Author. "On Reference Signal Design for Enhanced Control Channels." ST-Ericsson. 3GPP TSG-RAN WG1 #68. Feb. 6-10, 2012. R1-120076. Dresden, Germany.
Unknown, Author. "Multiplexing of Multiple E-PDCCHs for Distributed and Localized Transmissions." Samsung. 3GPP TSG RAN WG1 #68. Feb. 6-10, 2012. R1-120191. Dresden, Germany.
Unknown, Author. "Miltiplexing of ePDCCHs and ePDCCH RE Mapping." Panasonic. 3GPP TSG RAN WG1 Meeting #68. Feb. 6-10, 2012. R1-120237. Dresden, Germany.
3GPP, "3rd Generation Partnership Project; Technical Specification Group Radio Access Network; Evolved Universal Terrestrial Radio Access (E-UTRA); Physical Channels and Modulation (Release 11)", 3GPP TS 36.211 V11.0.0, Sep. 2012, 1-106.
Unknown, Author, "Consideration on enhanced PDCCH to REs mapping", LG-Ericsson, 3GPP TSG RAN WG1 #67, R1-114189, San Francisco, USA, Nov. 14-18, 2011, 1-2.
Unknown, Author, "PDCCH Enhancement in Rel-11", Alcatel-Lucent, Alcatel-Lucent Shanghai Bell, 3GPP TSG RAN WG1 Meeting #66, R1-112421, Athens, Greece, Aug. 22-26, 2011, 1-6.
Unknown, Author, "Summary of email discussion on enhanced PDCCH", Nokia, 3GPP TSG RAN WG1 Meeting #66bis, R1-113157, Zhuhai, China, Oct. 10-14, 2011, 1-7.

* cited by examiner

AGGREGATION OF RESOURCES IN ENHANCED CONTROL CHANNELS

RELATED APPLICATIONS

This application claims the benefit of and priority to U.S. Provisional Application Ser. No. 61/612,803, filed 19 Mar. 2012. The entire contents of said U.S. Provisional Application are incorporated herein by reference.

TECHNICAL FIELD

The present disclosure is related to control channel signaling in wireless communication systems, and is more particularly related to techniques for aggregating transmission resources to form enhanced control channel signals.

BACKGROUND

The 3$^{rd}$-Generation Partnership Project (3GPP) has developed a third-generation wireless communications known as Long Term Evolution (LTE) technology, as documented in the specifications for the Evolved Universal Terrestrial Radio Access Network (UTRAN). LTE is a mobile broadband wireless communication technology in which transmissions from base stations (referred to as eNodeBs or eNBs in 3GPP documentation) to mobile stations (referred to as user equipment, or UEs, in 3GPP documentation) are sent using orthogonal frequency division multiplexing (OFDM). OFDM splits the transmitted signal into multiple parallel sub-carriers in frequency.

More specifically, LTE uses OFDM in the downlink and Discrete Fourier Transform (DFT)-spread OFDM in the uplink. The basic LTE downlink physical resource can be viewed as a time-frequency resource grid. FIG. 1 illustrates a portion of the available spectrum of an exemplary OFDM time-frequency resource grid 50 for LTE. Generally speaking, the time-frequency resource grid 50 is divided into one millisecond subframes. As seen in FIGS. 1 and 2, each subframe includes a number of OFDM symbols. For a normal cyclic prefix (CP) length, which is suitable for use in situations where multipath dispersion is not expected to be extremely severe, a subframe consists of fourteen OFDM symbols. A subframe has only twelve OFDM symbols if an extended cyclic prefix is used. In the frequency domain, the physical resources are divided into adjacent subcarriers with a spacing of 15 kHz. The number of subcarriers varies according to the allocated system bandwidth. The smallest element of the time-frequency resource grid 50 is a resource element. A resource element consists of one OFDM subcarrier during one OFDM symbol interval.

LTE resource elements are grouped into resource blocks (RBs), which in its most common configuration consists of 12 subcarriers and 7 OFDM symbols (one slot). Thus, a RB typically consists of 84 REs. The two RBs occupying the same set of 12 subcarriers in a given radio subframe (two slots) are referred to as an RB pair, which includes 168 resource elements if a normal CP is used. Thus, an LTE radio subframe is composed of multiple RB pairs in frequency with the number of RB pairs determining the bandwidth of the signal. In the time domain, LTE downlink transmissions are organized into radio frames of 10 ms, each radio frame consisting of ten equally-sized subframes of length $T_{subframe}=1$ ms.

The signal transmitted by an eNB to one or more UEs may be transmitted from multiple antennas. Likewise, the signal may be received at a UE that has multiple antennas. The radio channel between the eNB distorts the signals transmitted from the multiple antenna ports. To successfully demodulate downlink transmissions, the UE relies on reference symbols that are transmitted on the downlink. Several of these reference symbols are illustrated in the resource grid 50 shown in FIG. 2. These reference symbols and their position in the time-frequency resource grid are known to the UE and hence can be used to determine channel estimates by measuring the effect of the radio channel on these symbols.

Several techniques may be used to take advantage of the availability of multiple transmit and/or receive antennas. Some of these are referred to as Multiple-Input Multiple-Output (MIMO) transmission techniques. One example technique used when multiple transmit antennas are available is called "transmit precoding," and involves the directional transmission of signal energy towards a particular receiving UE. With this approach, the signal targeted to a particular UE is simultaneously transmitted over each of several antennas, but with individual amplitude and/or phase weights applied to the signal at each transmit antenna element. This application of weights to the signal is referred to as "precoding," and the antenna weights for a particular transmission can mathematically be described in a comprehensive way by a precoding vector.

This technique is sometimes referred to as UE-specific precoding. The reference symbols accompanying a precoded transmission and used for its demodulation are denoted a UE-specific reference signal (UE-specific RS). If the transmitted symbols making up a UE-specific RS in a given RB are precoded with the same UE-specific precoding as the data carried in that RB (where data in this sense can be control information), then the transmission of the UE-specific RS and data can treated as though they were performed using a single virtual antenna, i.e. a single antenna port. The targeted UE performs channel estimation using the UE-specific RS and uses the resulting channel estimate as a reference for demodulating the data in the RB.

UE-specific RS are transmitted only when data is transmitted to a UE in the RB pair, and are otherwise not present. In Releases 8, 9, and 10 of the LTE specifications, UE-specific reference signals are included as part of each of the RBs that are allocated to a UE for demodulation of the physical downlink shared data channel (PDSCH). Release 10 of the LTE specifications also supports spatial multiplexing of the downlink transmission, allowing up to eight spatially multiplexed "layers" to be transmitted simultaneously. Accordingly, there are eight orthogonal UE-specific RS, which are described in the 3GPP document "Evolved Universal Terrestrial Radio Access (E-UTRA); Physical Channels and Modulation," 3GPP TS 36.211, v. 10.0.0 (December 2010), available at www.3gpp.org. These are denoted as antenna ports 7-15. FIG. 3 shows an example of the mapping of UE-specific reference symbols to a RB pair; in this example antenna ports 7 and 9 are shown. Antenna ports 8 and 10 can be obtained as code-division multiplexed reference signals on top of antenna ports 7 and 9, respectively.

Another type of reference symbols are those that can be used by all UEs. These reference symbols must therefore have wide cell area coverage and are thus not precoded towards any particular UE. One example is the common reference symbols (CRS) used by UEs for various purposes, including channel estimation and mobility measurements. These CRS are defined so that they occupy certain pre-defined REs within all the subframes in the system bandwidth, irrespectively of whether there is any data being sent to users in a subframe or not. These CRS are shown as "reference symbols" in FIG. 2.

Another type of reference symbol is the channel state information RS (CSI-RS), introduced in Release 10 of the LTE specifications. CSI-RS are used for measurements associated with precoding matrix and transmission rank selection for transmission modes that use the UE-specific RS discussed above. The CSI-RS are also UE-specifically configured. Yet another type of RS is the positioning RS (PRS), which was introduced in LTE Release 9 to improve positioning of UEs in a network.

Messages transmitted over the radio link to users can be broadly classified as control messages or data messages. Control messages are used to facilitate the proper operation of the system as well as proper operation of each UE within the system. Control messages include commands to control functions such as the transmitted power from a UE, signaling of RBs within which the data is to be received by the UE or transmitted from the UE, and so on.

Specific allocations of time-frequency resources in the LTE signal to system functions are referred to as physical channels. For example, the physical downlink control channel (PDCCH) is a physical channel used to carry scheduling information and power control messages. The physical HARQ indicator channel (PHICH) carries ACK/NACK in response to a previous uplink transmission, and the physical broadcast channel (PBCH) carries system information. The primary and secondary synchronization signals (PSS/SSS) can also be seen as control signals, and have fixed locations and periodicity in time and frequency so that UEs that initially access the network can find them and synchronize. Similarly, the PBCH has a fixed location relative to the primary and secondary synchronization signals (PSS/SSS). The UE can thus receive the system information transmitted in BCH and use that system information to locate and demodulate/decode the PDCCH, which carries control information specific to the UE.

As of Release 10 of the LTE specifications, all control messages to UEs are demodulated using channel estimates derived from the common reference signals (CRS). This allows the control messages to have a cell-wide coverage, to reach all UEs in the cell without the eNB having any particular knowledge about the UEs' positions. Exceptions to this general approach are the PSS and SSS, which are stand-alone signals and do not require reception of CRS before demodulation. The first one to four OFDM symbols of the subframe are reserved to carry such control information; one OFDM symbol is used for this purpose in the example subframe shown in FIG. 2, where the control region may contain up to three OFDM symbols for control signaling. The actual number of OFDM symbols reserved to the control region may vary, depending on the configuration of a particular cell.

Control messages can be categorized into messages that need to be sent only to one UE (UE-specific control) and those that need to be sent to all UEs or some subset of UEs numbering more than one (common control) within the cell being covered by the eNB. Messages of the first type (UE-specific control messages) are typically sent using the PDCCH, using the control region. It should be noted that in future LTE releases there will be new carrier types that may not have such a control region, i.e., that do not have PDCCH transmissions. These new carrier types may not even include CRS, and are therefore not backward compatible. A new carrier of this type is introduced in Release 11. However, this new carrier type is used only in a carrier aggregation scenario, and is always aggregated with a legacy (backward-compatible) carrier type. In future releases of LTE it may also be possible to have stand-alone carriers that do not have a control region and that are not associated with a legacy carrier.

Control messages of PDCCH type are transmitted in association with CRS, which are used by the receiving mobile terminals to demodulate the control message. Each PDCCH is transmitting using resource elements grouped into units called control channel elements (CCEs) where each CCE contains 36 REs. A single PDCCH message may use more than one CCE; in particular a given PDCCH message may have an aggregation level (AL) of 1, 2, 4 or 8 CCEs. This allows for link adaptation of the control message. Each CCE is mapped to 9 resource element groups (REGs) consisting of 4 RE each. The REGs for a given CCE are distributed over the system bandwidth to provide frequency diversity for a CCE. This is illustrated in FIG. 4. Hence, a PDCCH message can consist of up to 8 CCEs spanning the entire system bandwidth in the first one to four OFDM symbols, depending on the configuration.

Processing of a PDCCH message in an eNB begins with channel coding, scrambling, modulation, and interleaving of the control information. The modulated symbols are then mapped to the resource elements in the control region. As mentioned above, control channel elements (CCE) have been defined, where each CCE maps to 36 resource elements. By choosing the aggregation level, link-adaptation of the PDCCH is obtained. In total there are $N_{CCE}$ CCEs available for all the PDCCH to be transmitted in the subframe; the number $N_{CCE}$ may vary from subframe to subframe, depending on the number of control symbols n and the number of configured PHICH resources.

Since $N_{CCE}$ can vary from subframe to subframe, the receiving terminal must blindly determine the position of the CCEs for a particular PDCCH as well as the number of CCEs used for the PDCCH. With no constraints, this could be a computationally intensive decoding task. Therefore, some restrictions on the number of possible blind decodings a terminal needs to attempt have been introduced, as of Release 8 of the LTE specifications. One constraint is that the CCEs are numbered and CCE aggregation levels of size K can only start on CCE numbers evenly divisible by K. This is shown in FIG. 5, which illustrates CCE aggregation for aggregation levels AL-1, AL-2, AL-4, and AL-8. For example, an AL-8 PDCCH message, made up of eight CCEs, can only begin on CCEs numbered 0, 8, 16, and so on.

A terminal must blindly decode and search for a valid PDCCH over a set of CCEs referred to as the UE's search space. This is the set of CCEs that a terminal should monitor for scheduling assignments or other control information, for a given AL. An example search space is illustrated in FIG. 6, which illustrates the search space a particular terminal needs to monitor. Note that different CCEs must be monitored for each AL. In total there are NCCE=15 CCEs in this example. A common search space, which must be monitored by all mobile terminals, is marked with diagonal stripes, while a UE-specific search is shaded.

In each subframe and for each AL, a terminal will attempt to decode all of the candidate PDCCHs that can be formed from the CCEs in its search space. If the Cyclic Redundancy Check (CRC) for the attempted decoding checks out, then the contents of the candidate PDCCH are assumed to be valid for the terminal, and the terminal further processes the received information. Note that two or more terminals may have overlapping search spaces, in which case the network may have to select only one of them for scheduling of the control channel. When this happens, the non-scheduled terminal is said to be blocked. The search spaces for a UE vary pseudo-randomly from subframe to subframe to reduce this blocking probability.

As suggested by FIG. 6, the search space is further divided into a common part and a terminal-specific (or UE-specific) part. In the common search space, PDCCH containing information to all or a group of terminals is transmitted (paging, system information, etc.). If carrier aggregation is used, a terminal will find the common search space present on the primary component carrier (PCC) only. The common search space is restricted to aggregation levels 4 and 8, to give sufficient channel code protection for all terminals in the cell. Note that since it is a broadcast channel, link adaptation cannot be used. The m8 and m4 first PDCCH (where the "first" PDCCH is the one having the lowest CCE number) in an AL of 8 or 4, respectively, belong to the common search space. For efficient use of the CCEs in the system, the remaining search space is terminal specific at each aggregation level.

A CCE consists of 36 QPSK modulated symbols that map to 36 REs that are unique to the given CCE. Hence, knowing the CCE means that the REs are also known automatically. To maximize the diversity and interference randomization, interleaving is used before a cell-specific cyclic shift and mapping to REs. Note that in most cases some CCEs are empty, due to PDCCH location restrictions within terminal search spaces and aggregation levels. The empty CCEs are included in the interleaving process and mapped to REs as any other PDCCH, to maintain the search space structure. Empty CCEs are set to zero power, meaning that the power that would have otherwise been used may be allocated instead to non-empty CCEs, to further enhance the PDCCH transmission.

To facilitate the use of 4-antenna transmit diversity, each group of four adjacent QPSK symbols in a CCE is mapped to four adjacent REs, denoted a RE group (REG). Hence, the CCE interleaving is quadruplex-(group of 4) based. The mapping process has a granularity of 1 REG, and one CCE corresponds to nine REGs (36 RE).

Transmission of the physical downlink shared data channel (PDSCH) to UEs uses those REs in a RB pair that are not used either for control messages (i.e, in the data region of FIG. 4) or RS. The PDSCH can be transmitted using either UE-specific RS or the CRS as a demodulation reference, depending on the PDSCH transmission mode. The use of UE-specific RS allows a multi-antenna base station to optimize the transmission using pre-coding of both data and reference signals being transmitted from the multiple antennas so that the received signal energy increases at the UE and consequently, the channel estimation performance is improved and the data rate of the transmission could be increased.

For Release 11 of the LTE specifications, it has been agreed to introduce UE-specific transmission of control information in the form of enhanced control channels. This is done by allowing the transmission of control messages to a UE where the transmissions are placed in the data region of the LTE subframe and are based on UE-specific reference signals. Depending on the type of control message, the enhanced control channels formed in this manner are referred to as the enhanced PDCCH (ePDCCH), enhanced PHICH (ePHICH), and so on.

For the enhanced control channel in Release 11, it has been further agreed to use antenna port p∈{107, 108, 109, 110} for demodulation, which correspond with respect to reference symbol positions and set of sequences to antenna ports p∈{7, 8, 9, 10}, i.e., the same antenna ports that are used for data transmissions on the Physical Data Shared Channel (PDSCH), using UE-specific RS. This enhancement means that the precoding gains already available for data transmissions can be achieved for the control channels as well. Another benefit is that different physical RB pairs (PRB pairs) for enhanced control channels can be allocated to different cells or to different transmission points within a cell. This can be seen in FIG. 7, which illustrates ten RB pairs, three of which are allocated to three separate ePDCCH regions comprising one PRB pair each. Note that the remaining RB pairs can be used for PDSCH transmissions. The ability to allocate different PRB pairs to different cells or different transmission points facilitates inter-cell or inter-point interference coordination for control channels. This is especially useful for heterogeneous network scenarios, as will be discussed below.

The same enhanced control region can be used simultaneously by different transmission points within a cell or by transmission points belonging to different cells, when those points are not highly interfering with one another. A typical case is the shared cell scenario, an example of which is illustrated in FIG. 8. In this case, a macro cell 62 contains several lower power pico nodes A, B, and C within its coverage area 68, the pico nodes A, B, C having (or being associated with) the same synchronization signal/cell ID. In pico nodes which are geographically separated, as is the case with pico nodes B and C in FIG. 8, the same enhanced control region, i.e., the same PRBs used for the ePDCCH, can be re-used. With this approach, the total control channel capacity in the shared cell will increase, since a given PRB resource is re-used, potentially multiple times, in different parts of the cell. This ensures that area splitting gains are obtained. An example is shown in FIG. 9, which shows that pico nodes B and C share the enhanced control region whereas A, due to its proximity to both B and C, is at risk of interfering with the other pico nodes and is therefore assigned an enhanced control region which is non-overlapping. Interference coordination between pico nodes A and B, or equivalently transmission points A and B, within a shared cell is thereby achieved. Note that in some cases, a UE may need to receive part of the control channel signaling from the macro cell and the other part of the control signaling from the nearby Pico cell.

This area splitting and control channel frequency coordination is not possible with the PDCCH, since the PDCCH spans the whole bandwidth. Further, the PDCCH does not provide possibility to use UE-specific precoding since it relies on the use of CRS for demodulation.

FIG. 10 shows an ePDCCH that is divided into multiple groups and mapped to one of the enhanced control regions. This represents a "localized" transmission of the ePDCCH, since all of the groups making up the ePDCCH message are grouped together in frequency. Note that these multiple groups are similar to the CCEs in the PDCCH, but are not necessarily made up of the same numbers of REs. Also note that, as seen in FIG. 10, the enhanced control region does not start at OFDM symbol zero. This is to accommodate the simultaneous transmission of a PDCCH in the subframe. However, as was mentioned above, there may be carrier types in future LTE releases that do not have a PDCCH at all, in which case the enhanced control region could start from OFDM symbol zero within the subframe.

While the localized transmission of ePDCCH illustrated in FIG. 10 enables UE-specific precoding, which is an advantage over the conventional PDCCH, in some cases it may be useful to be able to transmit an enhanced control channel in a broadcasted, wide area coverage fashion. This is particularly useful if the eNB does not have reliable information to perform precoding towards a certain UE, in which case a wide area coverage transmission may be more robust. Another case where distributed transmission may be useful is when the particular control message is intended for more than one UE, since in this case UE-specific precoding cannot be used. This is the general approach taken for transmission of the common control information using PDCCH (i.e. in the common search space (CSS)).

Accordingly, a distributed transmission over enhanced control regions can be used, instead of the localized transmission shown in FIG. 10. An example of distributed transmission of the ePDCCH is shown in FIG. 11, where the four parts belonging to the same ePDCCH are distributed among the enhanced control regions.

3GPP has agreed that both localized and distributed transmission of an ePDCCH should be supported, these two approaches corresponding generally to FIGS. 10 and 11, respectively. When distributed transmission is used, then it is also beneficial if antenna diversity can be achieved to maximize the diversity order of an ePDCCH message. On the other hand, sometimes only wideband channel quality and wideband precoding information are available at the eNB, in which case it could be useful to perform a distributed transmission but with UE-specific, wideband, precoding.

Several problems relate to the use of the ePDCCH. For example, if an ePDCCH based on distributed transmission is mapped to all PRB pairs that have been configured for the UE, then it is currently a problem that unused resources in these PRB pairs cannot be simultaneously used for PDSCH transmission. As a result, a large control channel overhead will occur in the event that the fraction of unused resources is large. Another unsolved problem is how to handle the collisions between enhanced control channels and the legacy reference signals such as CSI-RS, CRS, PRS, PSS, SSS and legacy control channels such as PDCCH, PHICH, PCFICH and PBCH.

More generally, remaining challenges include how to design the search space for ePDCCH reception in an efficient manner, so that both the localized and distributed (or UE-specific precoding and diversity transmission) ePDCCH can be supported flexibly for different ePDCCH transmissions.

SUMMARY

One problem that arises with the use of ePDCCH is that when the REs in a PRB pair used for ePDCCH transmissions collide with transmissions of various reference signals, such as CRS, CSI-RS, PSS, SSS, PBCH or PRS, then puncturing of the ePDCCH may occur. Furthermore, the beginning OFDM symbol to be used for carrying ePDCCH in a given subframe could be configured to be different from the first OFDM symbol in the subframe, since the first n=1, 2, 3, or 4 OFDM symbols contain the legacy control channels. In both cases, REs are effectively removed from the eREGs, and the available number of REs within each eREG that can be used for transmission of the modulated ePDCCH symbols in an ePDCCH is smaller than in the nominal, non-punctured case. To maintain a consistent level of performance, this puncturing must be compensated for with link adaptation, by adjusting the aggregation level for the transmitted ePDCCH. Since the level of puncturing may depend on the subframe number, a given ePDCCH may require different aggregation levels in different subframes, even where the DCI payload and channel conditions are the same.

According to several embodiments detailed below, the set of available aggregation levels depends on the level of puncturing in the subframe, that is, the number of available REs, and is known to the eNB and UE. The level of puncturing may vary from one subframe to another, and thus the available set of aggregation levels may also vary from one subframe to the next.

An example method according to some embodiments is implemented at a transmitting end of a link, e.g., at an eNB in an LTE wireless system. This method for transmitting control information may be iterated for each of several subframes in which a plurality of non-overlapping subsets of resource elements, e.g., eREGs or eCCES, in at least one block of time-frequency resources, e.g., a PRB pair, are to be aggregated for transmitting the downlink control information.

The example method begins with determining members of a set of aggregation levels usable to aggregate the non-overlapping subsets of resource elements for transmitting downlink control information. This determining is based on a puncturing level to be used for the transmission of the downlink control information. The puncturing level determines the number of REs available to ePDCCH transmission. Thus, for example, a first set of aggregation levels may be usable when the puncturing level is less than 50%, while a second set of aggregation levels is usable when the puncturing level is greater than or equal to 50%. As suggested by the detailed examples given above, these sets may overlap in some cases, in that several aggregation levels are found in both sets. In other embodiments, however, these sets may be completely disjoint.

Downlink control information for the given subframe is mapped to one or more non-overlapping subsets of resource elements in the at least one block of time-frequency resources, according to an aggregation level selected from the determined set. The downlink control information for the given subframe is then transmitted, in the one or more non-overlapping subsets. The non-overlapping subsets of resource elements may be CCEs, eCCEs, and/or eREGs, in some embodiments, but other groupings or names for groupings may be used.

In several embodiments this method is repeated, for each of several subframes. As noted above, the puncturing may differ from one subframe to another. Accordingly, the set of aggregation levels usable in one subframe may differ from the set of aggregation levels usable in the next subframe, depending on the puncturing level that exists in the next subframe.

As suggested above, in some embodiments the puncturing level to be used for the transmission of the downlink control information in a given subframe depends on a number of reference signals to be transmitted in the at least one block of time-frequency resources in the subframe. The puncturing level may instead or also depend on a number of Orthogonal Frequency-Division Multiplexing (OFDM) symbols reserved exclusively for control information in the at least one block of time-frequency resources.

Other example embodiments include a complementary method for receiving downlink control information in a radio communication system, i.e., as implemented by a receiving node at the opposite end of a radio link from a node implementing the method summarized above. As was the case for the method summarized above, this method may be iterated for each of several subframes in which a plurality of non-overlapping subsets of resource elements, e.g., eREGs or eCCES, in at least one block of time-frequency resources, e.g., a PRB pair, are aggregated for a received transmission of the downlink control information.

This example method begins with determining members of a set of aggregation levels usable to aggregate the non-overlapping subsets of resource elements for the received transmission of the downlink control information. This determination is based on a puncturing level to be used for the received transmission of the first downlink control information, that is, based on the number of REs available for ePDCCH, and uses the same rule or rules used by the transmitting end of the link. Downlink control information is received by de-mapping the downlink control information from one or more non-overlapping subsets of resource elements in the at least one block of time-frequency resources, according to an aggregation level selected from the determined set.

As was the case with the previously summarized method, the puncturing to be used for transmissions of the ePDCCH may vary from one subframe to another. Accordingly, in some embodiments of the illustrated method, the operations above are followed by a second iteration, for a second subframe, in which members of a second set of aggregation levels are determined, based on a puncturing level to be used for a received transmission of second downlink control information in the second subframe, where the second set of aggregation levels differs from the first set. The second downlink control information is then received by de-mapping the second downlink control information from one or more second non-overlapping subsets of resource elements in the at least one block of time-frequency resources, according to an aggregation level selected from the determined second set.

The puncturing level to be used for the received transmissions may depend on a number of reference signals in the at least one block of time-frequency resources in each subframe, in some embodiments. In these or in other embodiments, the puncturing level may depend on a number of OFDM symbols reserved exclusively for control information in the at least one block of time-frequency resources.

Other, related, embodiments include methods for transmitting downlink control information in a radio communication system, whereby localized and distributed transmissions of control channel messages may utilize the same PRB pair or pairs. An example method includes transmitting a first control message to a first user equipment (UE) using a first PRB pair, where the first control message is divided among two or more first non-overlapping subsets of resource elements, at least one of which is in the first PRB pair. These two or more first non-overlapping subsets of resource elements are aggregated in a frequency-localized manner within at least the first PRB pair, and symbols in these two or more first non-overlapping subsets of resource elements are transmitted using a single antenna port. The method further includes simultaneously transmitting a second control message to a second UE, also using the first PRB pair, where the second control message is divided among two or more second non-overlapping subsets of resource elements, at least one of which is in the first PRB pair. In this case, the two or more second non-overlapping subsets of resource elements are aggregated in a frequency-distributed manner across the first PRB pair and one or more additional PRB pairs, and symbols in at least two of the two or more second non-overlapping subsets of resource elements are transmitted using differing antenna ports. These differing antenna ports include the single antenna port used to transmit the symbols in the two or more first non-overlapping subsets of resource elements.

Of course, the techniques, systems, and apparatus described herein are not limited to the above features and advantages. Indeed, those skilled in the art will recognize additional features and advantages upon reading the following detailed description, and upon viewing the accompanying drawings.

DETAILED DESCRIPTION

Figure 1:
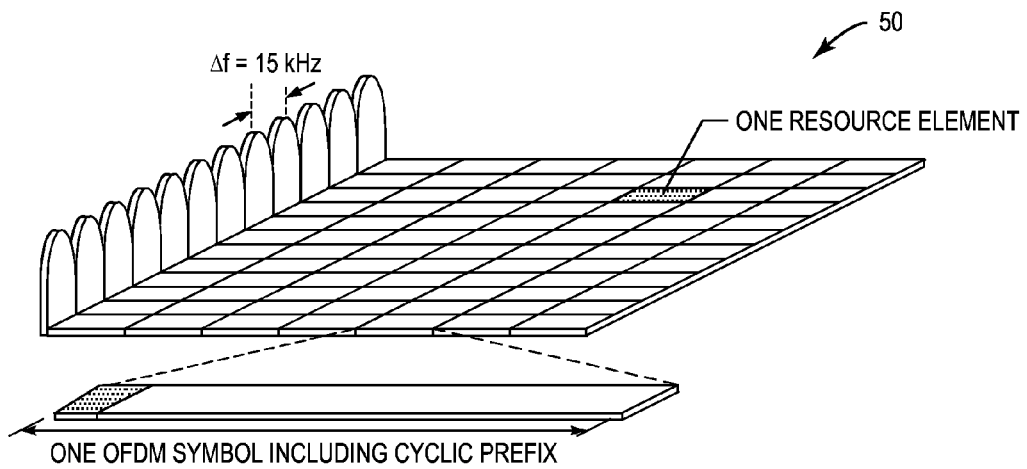
FIG. 1 illustrates the time-frequency resource grid of an OFDM signal.
Figure 2:
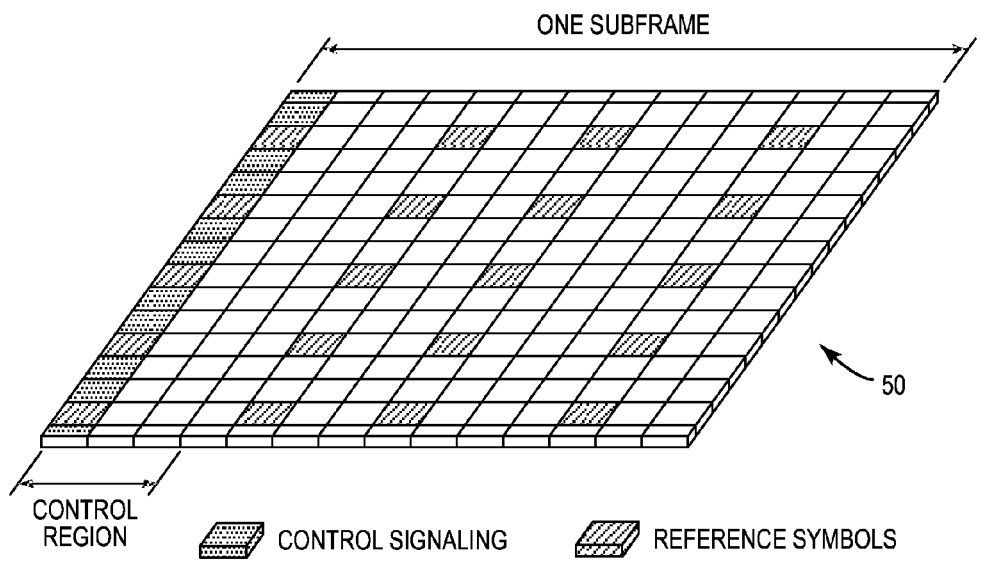
FIG. 2 illustrates a subframe of an LTE signal with one OFDM symbol of control signaling.

In the discussion that follows, specific details of particular embodiments of the presently disclosed techniques and apparatus are set forth for purposes of explanation and not limitation. It will be appreciated by those skilled in the art that other embodiments may be employed apart from these specific details. Furthermore, in some instances detailed descriptions of well-known methods, nodes, interfaces, circuits, and devices are omitted so as not to obscure the description with unnecessary detail. Those skilled in the art will appreciate that the functions described may be implemented in one or in several nodes. Some or all of the functions described may be implemented using hardware circuitry, such as analog and/or discrete logic gates interconnected to perform a specialized function, ASICs, PLAs, etc. Likewise, some or all of the functions may be implemented using software programs and data in conjunction with one or more digital microprocessors or general purpose computers. Where nodes that communicate using the air interface are described, it will be appreciated that those nodes also have suitable radio communications circuitry. Moreover, the technology can additionally be considered to be embodied entirely within any form of computer-readable memory, including non-transitory embodiments such as solid-state memory, magnetic disk, or optical disk containing an appropriate set of computer instructions that would cause a processor to carry out the techniques described herein.

Hardware implementations may include or encompass, without limitation, digital signal processor (DSP) hardware, a reduced instruction set processor, hardware (e.g., digital or analog) circuitry including but not limited to application specific integrated circuit(s) (ASIC) and/or field programmable gate array(s) (FPGA(s)), and (where appropriate) state machines capable of performing such functions.

In terms of computer implementation, a computer is generally understood to comprise one or more processors or one or more controllers, and the terms computer, processor, and controller may be employed interchangeably. When provided by a computer, processor, or controller, the functions may be provided by a single dedicated computer or processor or controller, by a single shared computer or processor or controller, or by a plurality of individual computers or processors or controllers, some of which may be shared or distributed. Moreover, the term "processor" or "controller" also refers to other hardware capable of performing such functions and/or executing software, such as the example hardware recited above.

References throughout the specification to "one embodiment" or "an embodiment" mean that a particular feature, structure, or characteristic described in connection with an embodiment is included in at least one embodiment of the present invention. Thus, the appearance of the phrases "in one embodiment" or "in an embodiment" in various places throughout the specification are not necessarily all referring to the same embodiment. Further, the particular features, structures or characteristics may be combined in any suitable manner in one or more embodiments.

Figure 10:
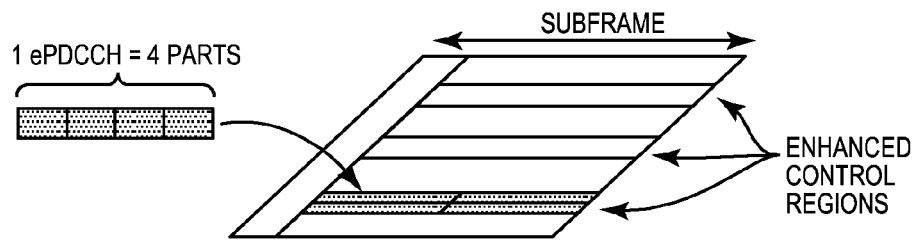
FIG. 10 illustrates the localized mapping of an ePDCCH to an enhanced control region.
Figure 12:
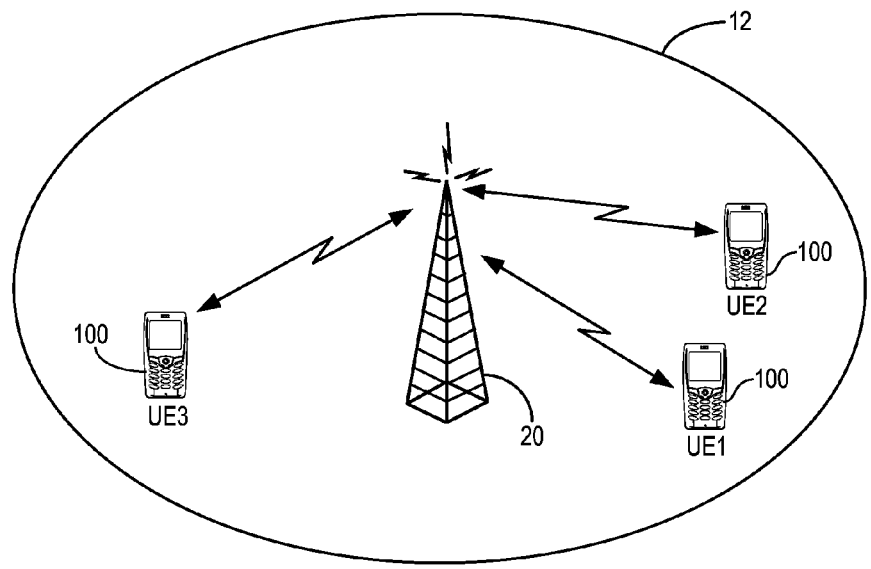
FIG. 12 illustrates an example radio communications network in which several of the presently disclosed techniques may be applied.

Referring once again to the drawings, FIG. 12 illustrates an exemplary mobile communication network 10 for providing wireless communication services to mobile stations 100. Three mobile stations 100, which are referred to as "user equipment" or "UE" in LTE terminology, are shown in FIG. 10. The mobile stations 100 may comprise, for example, cellular telephones, personal digital assistants, smart phones, laptop computers, handheld computers, or other devices with wireless communication capabilities. It should be noted that the terms "mobile station" or "mobile terminal," as used herein, refer to a terminal operating in a mobile communication network and do not necessarily imply that the terminal itself is mobile or moveable. Thus, the terms may refer to terminals that are installed in fixed configurations, such as in certain machine-to-machine applications, as well as to portable devices, devices installed in motor vehicles, etc.

The mobile communication network 10 comprises a plurality of geographic cell areas or sectors 12. Each geographic cell area or sector 12 is served by a base station 20, which is generally referred to in LTE as an Evolved NodeB (eNodeB). One base station 20 may provide service in multiple geographic cell areas or sectors 12. The mobile stations 100 receive signals from base station 20 on one or more downlink (DL) channels, and transmit signals to the base station 20 on one or more uplink (UL) channels.

For illustrative purposes, several embodiments will be described in the context of context of E-UTRAN, also referred to as LTE. It should be understood that the problems and solutions described herein are equally applicable to wireless access networks and user equipment (UEs) implementing other access technologies and standards. LTE is used as an example technology where the invention is suitable, and using LTE in the description therefore is particularly useful for understanding the problem and solutions solving the problem. Those skilled in the art will appreciate, however, that the presently disclosed techniques may be more generally applicable to other wireless communication systems, including, for example, WiMax (IEEE 802.16) systems. The use of LTE terminology to describe the various embodiments detailed below should thus not be seen as limiting to this particular technology.

Figure 11:
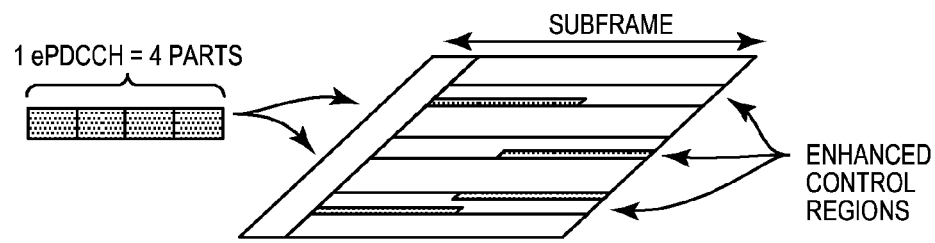
FIG. 11 illustrates the distributed mapping of an ePDCCH to enhanced control regions.

As noted above, 3GPP has agreed that both distributed and localized transmission of an ePDCCH should be supported in forthcoming releases of the standards for LTE, these two approaches corresponding generally to FIGS. 10 and 11, respectively. When distributed transmission is used, then it is also generally beneficial if antenna diversity can be achieved to maximize the diversity order of an ePDCCH message. On the other hand, sometimes only wideband channel quality and wideband precoding information are available at the eNB, in which case it could be useful to perform a distributed transmission but with UE-specific, wideband, precoding.

Figure 3:
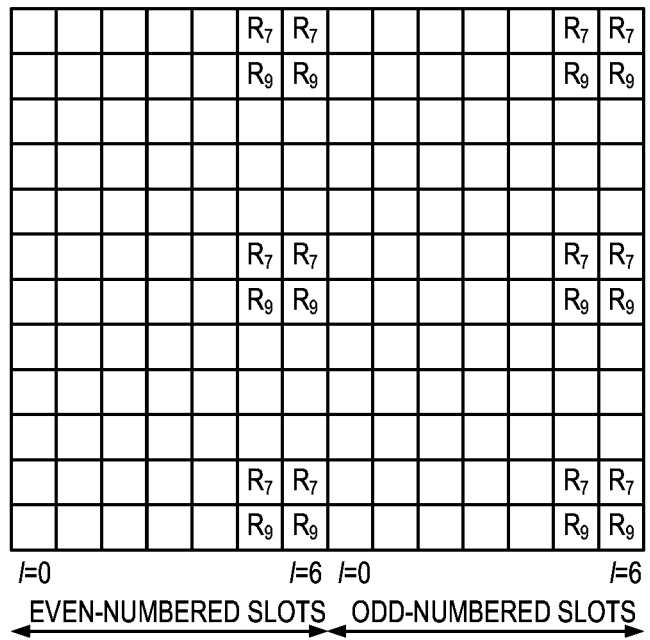
FIG. 3 illustrates an example mapping of UE-specific reference symbols to a PRB pair.
Figure 4:
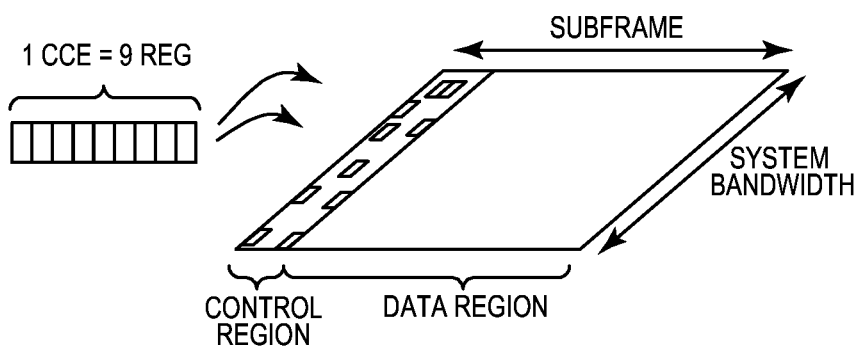
FIG. 4 illustrates the mapping of a CCE to the control region of an LTE subframe.
Figure 5:
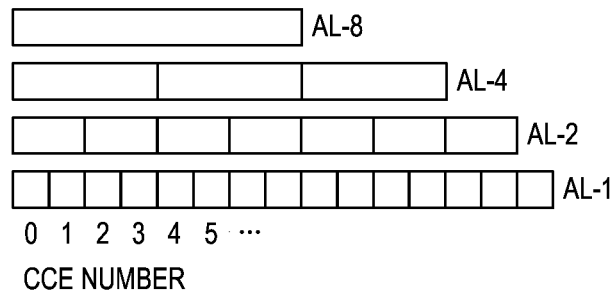
FIG. 5 illustrates the aggregation of CCEs into control channel messages.
Figure 6:
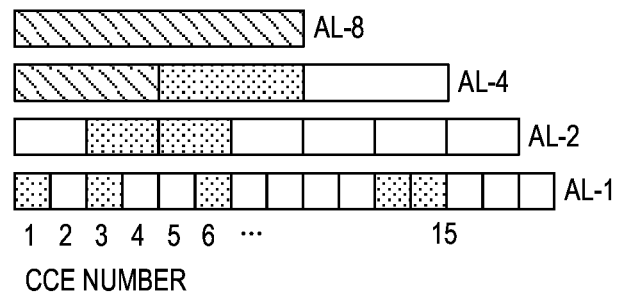
FIG. 6 illustrates an example search space.
Figure 7:
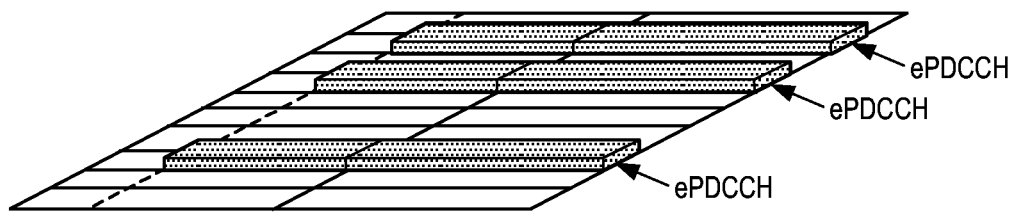
FIG. 7 illustrates the mapping of an example enhanced control channel region to an LTE subframe.
Figure 8:
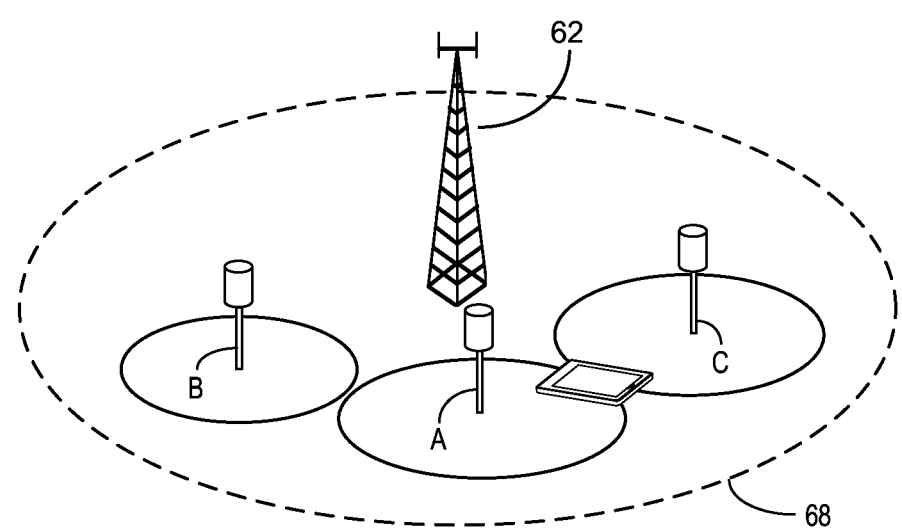
FIG. 8 illustrates an example heterogeneous network.
Figure 9:
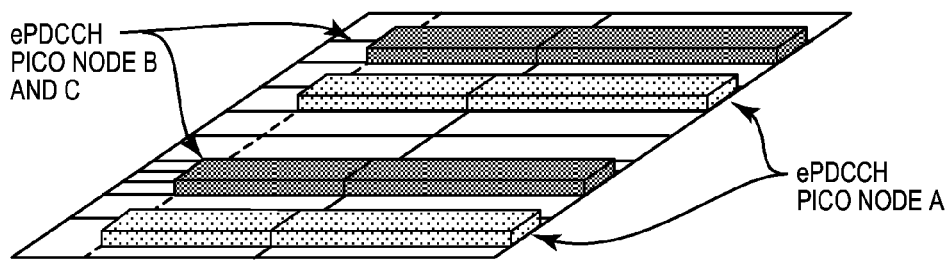
FIG. 9 illustrates an allocation of ePDCCH to pico nodes in a heterogeneous network.

As of release 11 of the LTE specifications, the enhanced control channel will use UE-specific RS (e.g., as shown in FIG. 3) as the reference for demodulation. A given ePDCCH will use one, some or all of antenna ports 7, 8, 9, and 10 for demodulation, depending on the number of antenna ports needed in a RB pair.

Each PRB pair used for the enhanced control channel can be divided into various groups of time-frequency resources, denoted enhanced or extended resource element groups (eREGs), or enhanced CCEs (eCCEs). In localized ePDCCH transmission, each group of time-frequency resources is associated with a unique RS from the set of UE-specific RS, or equivalently antenna port, which is located in the same RB or RB pair. For instance, when a UE demodulates the information in a given eREG of the RB or RB pair, it uses the RS/antenna port associated with that eREG. Furthermore, each resource in an RB or RB pair can be independently assigned to UEs.

Figure 13:
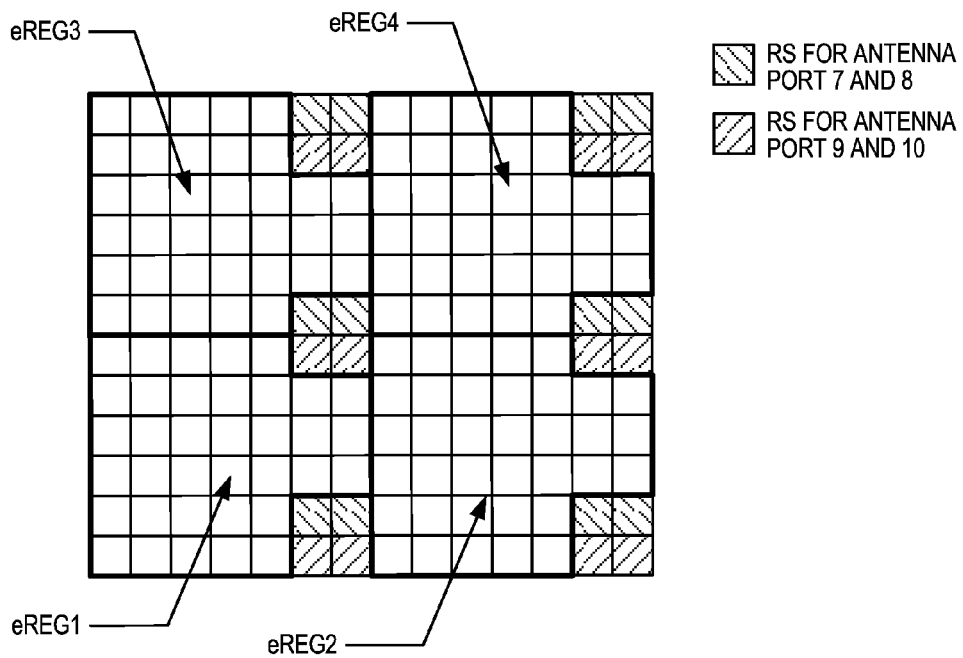
FIG. 13 illustrates an example mapping of eREGs and antenna ports to a PRB pair.

FIG. 13 shows an example of one possible grouping, illustrating a downlink RB pair with four enhanced resource element groups (eREG), each eREG consisting of 36 RE. Each eREG is associated with an antenna port (AP). In this example, each AP is associated with two eREG. Antenna ports using the same resource elements (e.g., ports 7 and 8) are made orthogonal by the use of orthogonal cover codes (OCC).

Figure 14:
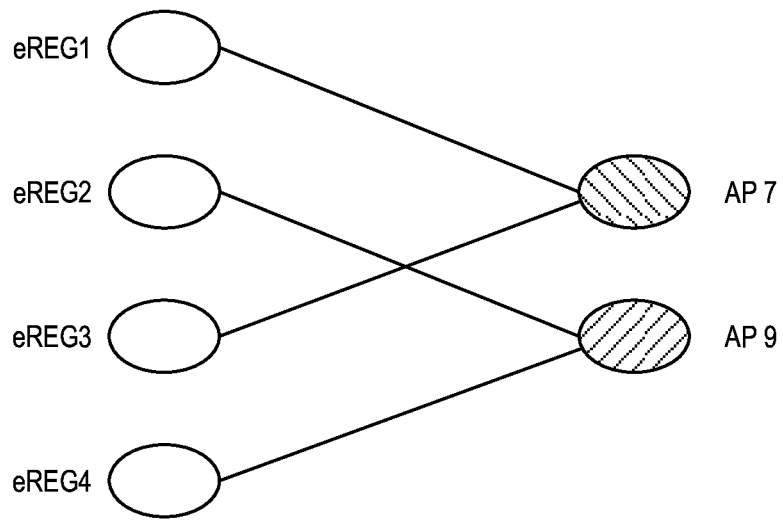
FIG. 14 shows one possible association of antenna ports to eREGs for the example mapping of FIG. 13.

FIG. 14 illustrates an association of AP to eREG for the example of FIG. 13. Here it can be seen that eREG1 and eREG3 are each associated with AP7, while eREG2 and eREG4 are associated with AP9. When a UE demodulates part of an ePDCCH transmitted in eREG1, for example, it will use the RS associated with AP7 for demodulation. When a UE demodulates an ePDCCH transmitted in eREG1 and eREG2, it will use both AP7 and AP9 for demodulation of the corresponding part of the ePDCCH message. In this way, antenna diversity can be obtained for the ePDCCH if multiple antennas are available at the eNB and if AP7 and AP9 are mapped to different antennas.

Note that even if multiple orthogonal RS are used in the RB or RB pair, there is only a single layer of control data transmitted. As can be seen in FIG. 14, it is possible that more than one eREG are using a given AP, which is possible since the eREG are orthogonal in the time-frequency OFDM grid. Referring again to FIGS. 13 and 14, for example, eREG1 and eREG3 are associated with the same antenna port and thus are transmitted with the same precoding vector. Note that if a given ePDCCH uses all the eREGs in a PRB pair configured according to FIGS. 13 and 14, then antenna diversity or precoding beam diversity can be achieved. This can be useful in the event the preferred precoding vector is unknown at the base station side, or if the control message carried by the ePDCCH is intended for multiple UEs (e.g. a common control channel).

Figure 15:
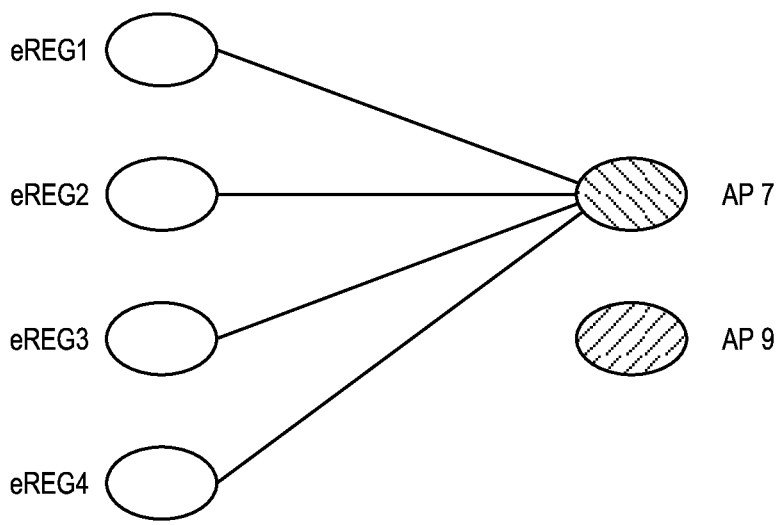
FIG. 15 shows another possible association of antenna ports to eREGs for the example mapping of FIG. 13.

Alternatively, if the ePDCCH uses all the eREGs in a PRB pair and the base station chooses to perform precoding to a single UE, i.e., with the same precoder applied to all eREGs in the PRB pair, then only one antenna port needs to be used and UE-specific precoding can then be applied to the whole ePDCCH message. The related node diagram for this scenario is shown in FIG. 15, which illustrates an association of AP to eREG in the event that all eREGs are being used for the same UE and thus only AP7 needs to be used (AP9 is unused).

Control information can be transmitted in each group of time-frequency resources, or eREG. The control information in a given eREG may consist of, but is not limited to, all or part of an enhanced PDCCH, all or part of a CCE, or all or part of an enhanced PHICH or enhanced PBCH. If the resource/eREG is too small to contain a whole enhanced PDCCH, CCE, PHICH or PBCH, a fraction can be transmitted in the eREG and the remaining portion in other eREGs, in the same RB or RB pair or in RB pairs elsewhere in the same subframe.

If an ePDCCH for distributed transmission is mapped to all PRB pairs that have been configured for the UE, then it is a problem, according to current 3GPP agreements, that unused resources in these PRB pairs cannot be simultaneously used for PDSCH transmission. As a result, a large control channel overhead will occur in the event that the fraction of unused resources is large. Another problem is how to handle the collisions between enhanced control channels and the legacy reference signals such as CSI-RS, CRS, PRS, PSS, SSS and legacy control channels such as PDCCH, PHICH, PCFICH and PBCH.

As noted above, a more general problem is how to design the search space for ePDCCH reception in an efficient manner, so that both localized and distributed (or UE-specific precoding and diversity transmission) ePDCCH can be supported flexibly for different ePDCCH transmissions. Hence, it is a problem how a CCE or other group of time-frequency resources can be used for either localized transmission or distributed transmission without need for RRC reconfiguration. In other words, it is a problem how to have flexible use of a CCE or other group of time-frequency resources without configuring each one semi-statically to be of one or the other type.

It is further a problem how to define the search space so that the UE can receive the ePDCCH from more than one transmission point in a transparent manner, and possibly with only low capacity backhaul between the transmission points, which implies that only semi-static ePDCCH coordination between these transmission points is possible.

According to various embodiments, examples of which are described below, the PRB pairs configured for use in transmitting and receiving an ePDCCH (i.e., the PRB pairs making up a UE's search space) are divided into one or more groups of PRB pairs, where:

A given ePDCCH is mapped to resource elements within one such group only;

The association between CCE, eREG, or other group of time-frequency resources is arranged so that a particular group of time-frequency resources can be used flexibly for either UE-specific precoding or diversity transmission, depending on configuration and/or depending whether the search space where the ePDCCH is received is common or UE-specific; and Localized and distributed ePDCCH transmission can be received within a group depending on the how the aggregation of resources within the group is performed.

In some embodiments, a common search space may be mapped to only one of the groups of PRB pairs; this group could be denoted the primary group. The primary group's location can be signaled to the UE in one of the information blocks, such as the MIB transmitted in the PBCH. This primary group could be used for initial access to the system and for access to CSS on a stand-alone carrier that does not have legacy PDCCH transmitted In some embodiments, the size of a group in terms of number of PRB pairs depends on the level of puncturing and may differ from subframe to subframe. In still other embodiments, groups of resources within a given PRB pair or pairs may be grouped, i.e., aggregated, in a manner that depends of the level of puncturing for the PRB pairs.

These and other features of various embodiments will now be further described.

To provide ePDCCH transmission to a given UE, a number K_ePDCCH of PRB pairs out of a total of K' PRB pairs available to the UE are configured to the UE. (K' may be the number of PRB pairs in the system bandwidth for that particular carrier or a UE-specific bandwidth in terms of number of PRB pairs within the carrier.) In other words, the UE is informed that a particular set of K_ePDCCH PRB pairs are allocated for enhanced control channel use.

As noted above, the resource elements in the PRB pairs may be grouped into one or more sets of non-overlapping groups of resource elements. Thus, for example, the total number of available control channel elements (CCE) in the enhanced control region for a UE may be N_CCE-ePDCCH; these CCEs are mapped to resource elements in the K_ePDCCH PRB pairs in a specified manner that is known at both the eNB and the UE.

The available resource elements (REs) in each PRB pair may be further divided into non-overlapping subsets of REs, which may be denoted extended resource element groups (eREG) or enhanced CCE (eCCE), or the like. In the following description in this specification, the term "eREG" will be used to refer to such a subset, but it will be appreciated that "eCCE" or any other name can be used instead for denoting such a subset of REs. In one example, a PRB pair is divided into eight eREG, where each eREG contains 18 RE, a total of 144 RE. A PRB pair in a subframe with normal cyclic prefix contains 168 RE and the remaining 24 REs in the PRB pair contains the demodulation reference signals (DMRS), in form of antenna port 7, 8, 9 and 10. In another example, each eREG contains 9 REs. In this case, a PRB pair contains 16 eREGs, in addition to the 24 REs set aside for the DMRS. Other sizes and arrangements of eREGs are possible.

As noted above in the background section, when UE-specific precoding of an ePDCCH is used, each eREG is associated with an antenna port and the corresponding reference symbols in the same PRB pair as the eREG. When a UE demodulates an ePDCCH that uses that eREG, the reference symbols for the associated antenna port are used for channel estimation. Hence, the antenna port association is implicit. When an ePDCCH maps to multiple eREG within the same PRB pair, then multiple antenna ports may be associated with these eREGs. Depending on whether UE-specific precoding or diversity transmission is configured for this ePDCCH, only a subset of these associated antenna ports may be used to demodulate the ePDCCH. As an example, when UE-specific precoding is used, then only one of these associated AP may be used by the UE and if diversity transmission is used, then two may be used.

Figure 16:
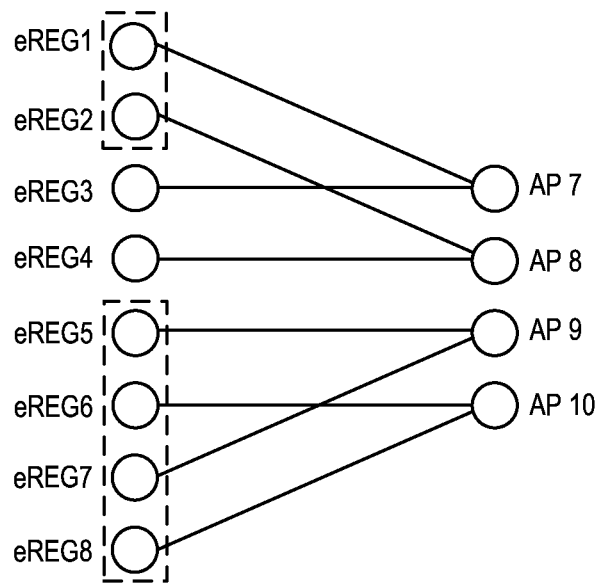
FIG. 16 illustrates an example of antenna port associations for diversity transmission for an example PRB pair that includes eight eREGs and four antenna ports.

An example of antenna port association for a configuration where each PRB pair includes 8 eREGS is shown in FIG. 16. In this example, the 8 eREGs of the PRB pair map to four antenna ports and are grouped into several ePDCCHs. In this example, a first ePDCCH includes eREG1 and 2, where eREG1 is mapped to AP7 and eREG2 is mapped to AP8. (Note that this same ePDCCH may include eREGs in additional PRB pairs as well). Antenna port diversity is obtained for this ePDCCH since the two used eREGs are transmitted via two different antenna ports. In the same PRB, another ePDCCH uses eREGs 5-8 and achieves two-fold diversity by the use of antenna port 9 and 10.

Figure 17:
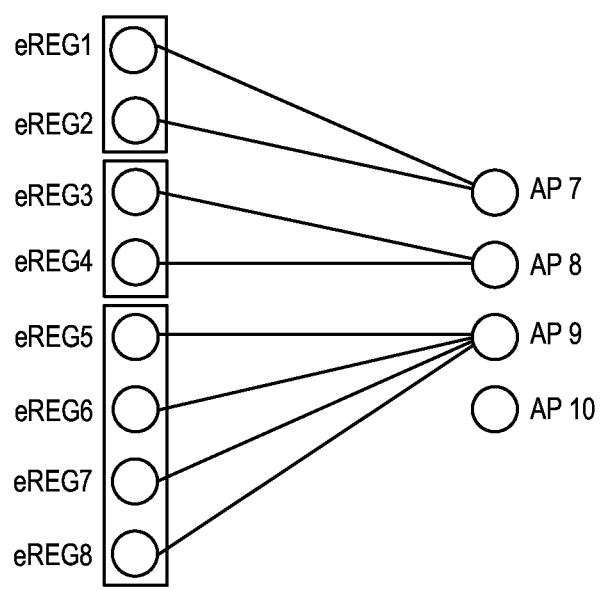
FIG. 17 illustrates an example of antenna port associations for UE-specific precoding transmission for an example PRB pair that includes eight eREGs and four antenna ports.

Given the same PRB pair, UE-specific precoding could alternatively be used, in which case only a single AP is associated with each group of eREGs that belong to the same ePDCCH within the PRB pair. An example of this is shown in FIG. 17, where antenna port associations for UE-specific precoding transmission are shown in an example PRB that again includes eight eREGs and four antenna ports. One ePDCCH includes eREGs 1 and 2, which are both mapped to AP7. Another ePDCCH includes eREGs 3 and 4, which are mapped to AP8. Still another ePDCCH includes eREGS 5, 6, 7, and 8, which are all mapped to AP9.

It may be noted that in the examples given in FIGS. 16 and 17, each eREG in the lower set of four eREGs in each case is associated to either AP9 or AP10, while each eREG in the upper set is associated to either AP7 or AP8. Thus, two independent and frequency-division-multiplexed set of antenna ports are separately associated with the upper and lower sets of eREGs. This makes it possible to have different transmission modes (UE-specific precoding or diversity) apply to groupings of eREGs in the upper and lower sets. Thus, for example, it is possible to map eREGs 1-4 to AP7 and AP8 in the manner shown in FIG. 16, to achieve antenna diversity for the corresponding ePDCCHs, while simultaneously using the mapping shown in FIG. 17 for eREGs 5-8, to utilize UE-specific precoding for the corresponding ePDCCH.

One problem with this arrangement, however, is that if the CCE that maps to eREGs 1 and 2 is using diversity then eREGs 3 and 4 also use diversity. The same goes for UE-specific precoding. Accordingly, it would be beneficial to have even more flexibility between UE-specific and diversity transmission within the same PRB pair. A solution is given in the embodiment described below.

Figure 18:
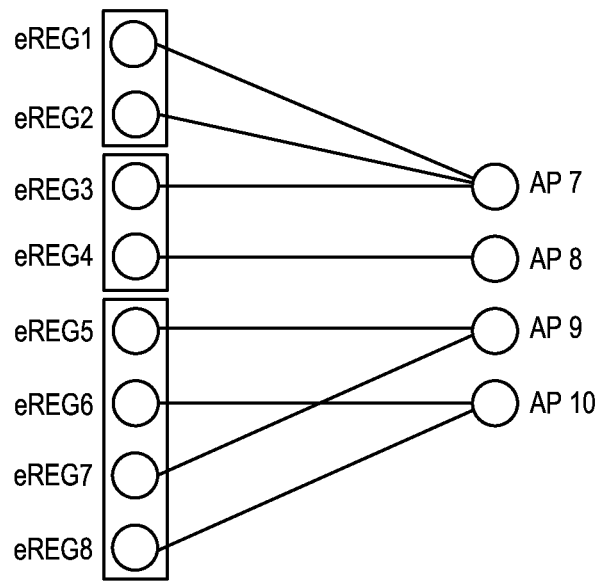
FIG. 18 illustrates an example of antenna port associations for both diversity transmission and UE-specific precoding transmission in a single PRB pair.

Given an association between eREGs and APs like that shown in FIG. 16 and FIG. 17 above, a first embodiment provides the flexibility to have both UE-specific precoding and diversity transmission in the same PRB pair, by enabling them to co-exist within the same set of eREGs (upper and lower sets respectively). An example of this is shown in FIG. 18, which illustrates antenna port associations for both UE-specific precoding transmission and diversity transmission in the same PRB pair. More specifically, in the example of FIG. 18, the ePDCCH using eREGs 1 and 2 is using UE-specific precoding and thus only one antenna port, while the ePDCCH that uses eREGs 3 and 4 is using diversity transmission. Since eREGs 1 and 2 are using UE-specific precoding, the precoding vector used for AP 7 is selected to provide precoding gain towards the UE receiving the ePDCCH in eREGs 1 and 2. For the ePDCCH using eREGs 3 and 4, the precoding vector of AP 7 is thus already determined. But, antenna port diversity can be obtained if the eNB selects the precoding vector for AP 8 to be different than the one used for AP 7. Preferably this is a precoding vector that is orthogonal to the one used for AP 7.

With this arrangement, the PRB pair can be divided into eight eREGs that can be freely used for either diversity or UE-specific precoding for groups of two eREGs. It should be noted also that each pair of two eREGs consists of 36 REs, in this example, which equals the size of a conventional CCE. Hence, for each CCE mapped to a PRB pair, either UE-specific precoding or diversity transmission can be used, and the antenna port association can still be implicit based on the actual eREGs that are used. This removes the need for antenna port signaling to a UE, which is a benefit of the solution in this embodiment. This also means that whether UE-specific precoding or diversity transmission is used only impacts a single CCE, and is thus self-contained within the CCE. It should be clear that these advantages are not limited to the particular definitions of eREG and CCE used in the illustrative examples described above, but may apply to other arrangements as well.

Given the approach described above, search space design becomes greatly simplified, since both localized and distributed transmissions can be defined in a given set of N_CCE-ePDCCH CCEs, by using different aggregations of the available eREGs. Note that localized transmissions commonly use UE-specific precoding while distributed transmissions may use either UE-specific or diversity transmission, but frequently use diversity transmission. Accordingly, the flexible approach described above for allowing both UE-specific precoding and diversity transmissions in the same PRB pair translates directly into a corresponding flexibility with respect to supporting both localized transmissions and distributed transmissions using eREGs in a given PRB pair.

As shown above, a UE can be configured to use UE-specific precoding or diversity transmission with respect to an ePDCCH, and transmissions for a given UE can be multiplexed, in the same PRB pair, with transmissions for other UEs, where each of the transmissions can independently be configured for a UE-specific or diversity transmission. It is then a further problem how to define the search space to accommodate both localized and distributed transmissions and transmissions with UE-specific and diversity. This is addressed in the second embodiment described below, which second embodiment can advantageously be combined with the solutions described above, or used independently thereof.

With respect to this second embodiment, consider that localized transmission implies that eREGs and CCEs within the same PRB pair or within at most two PRB pairs are aggregated to form an ePDCCH, while distributed transmission implies that the ePDCCH candidate consists of eREGs and CCEs aggregated from multiple PRB pairs.

Allowing eREGs/CCEs from within a given PRB pair to be flexibly used for either localized or distributed transmission can be managed by, for example, defining a matrix where each element is a CCE (or eREG or eCCE or any other name that implies a set of REs in the PRB pair) in a given PRB pair. While the following discussion assumes that a CCE consists of two eREGs, it should be appreciate that this is a non-limiting example of just one of the possible groupings of REs.

Figure 19:
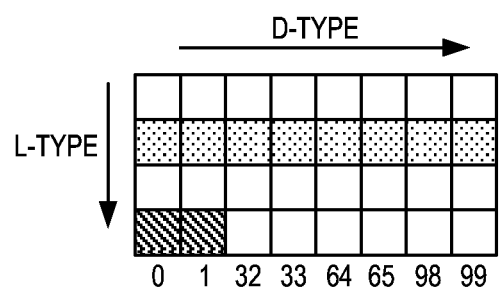
FIG. 19 illustrates a two-dimensional representation of a search space that includes both localized and distributed aggregations of CCEs.

FIG. 19 illustrates an example of such a matrix, for an example where the search space comprises K_ePDCCH=8 PRB pairs, with 4 CCE per PRB pair defined. Hence, there are N_CCE-ePDCCH=32 CCEs in this example. The indices of the used PRB pairs are 0, 1, 32, 33, 64, 65, 98 and 99 as shown in FIG. 19. An aggregation of CCEs across two or more of the PRB pairs, in a horizontal direction, provides a distributed transmission. Localized transmissions may be performed using aggregations of several CCEs within a single PRB pair, or using several CCEs within two adjacent PRB pairs, where the CCEs are aggregated in a generally vertical direction. Thus, FIG. 19 illustrates a two-dimensional search space that encompasses both localized (L) and distributed (D) aggregations of CCEs. Two ePDCCH candidates with distributed transmission are shown in FIG. 19, with AL=8 and AL=2, respectively.

The CCEs available in the search space for the UE can thus be illustrated by a 4×8 matrix, in this example, where distributed transmission implies aggregation of CCEs in the horizontal direction and localized transmission implies aggregation of CCEs in the vertical direction. The UE is configured so that a given ePDCCH transmission uses either UE-specific or diversity transmission, and can thus associate the eREGs to the proper antenna ports according to the first embodiment described above. This configuration can be achieved by RRC signaling, in some embodiments. In some cases, this configuration can be dependent on which search space the ePDCCH belong to. For instance, when an ePDCCH is transmitted in the common search space, then diversity transmission may be always assumed, in some embodiments. Note that this approach also allows a distributed transmission to utilize UE-specific precoding, which is useful if the preferred precoding information for a given UE is available at the transmitted base station but frequency diversity transmission is still preferable. One example is when wideband precoding and wideband channel quality information (CQI) are available.

One potential problem with the solution described above in the second embodiment is that an AL=8 distributed transmission blocks all localized transmissions with AL>2. This problem is further addressed by a third embodiment described below. This third embodiment can be combined with any or all of the previous ones, or used independently thereof.

To achieve maximal frequency diversity, an ePDCCH should preferably be mapped to all K_ePDCCH configured PRB pairs for the UE. It has been agreed in 3GPP that whenever an ePDCCH is using a PRB pair, then PDSCH cannot be transmitted in that PRB pair. It is then a problem that when only a few of the eREGs per PRB pair are used, which may frequently be the case when the ePDCCH load is low, most of the eREGs will then be empty. This leads to substantial and unnecessary control channel overhead.

Figure 20:
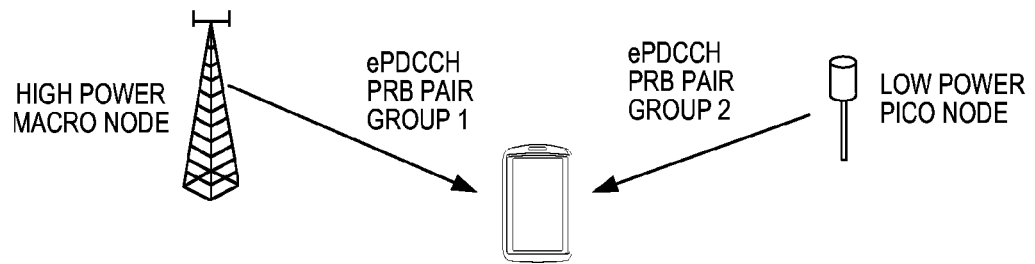
FIG. 20 shows elements of an example wireless network where a UE may receive ePDCCH transmissions from one or both of two nodes.

Furthermore, it is beneficial that a UE can receive an ePDCCH from one transmission point within a cell and another ePDCCH from another transmission point within the same cell. For instance, a common search space may be transmitted from a transmission point with high power (macro) while the UE-specific search space may be transmitted from a low power node (sometimes called a "pico node") in the same cell. FIG. 20 illustrates an example where a UE may receive ePDCCH transmissions from either a macro or a pico node, or simultaneously from both nodes. To accomplish this, two different PRB groups are used for the two nodes.

Another possible scenario is that downlink assignments are transmitted from one transmission point while uplink grants are transmitted from another transmission point. In this scenario, as in the previous one, it is a problem how to coordinate, between the transmission points, the ePDCCH transmissions to the same UE in the same subframe. This is especially a problem if fast backhaul is not available, as quick communication between the transmitting nodes is then not possible. It is a further problem in these example scenarios that the received power levels between the ePDCCHs received from different transmission points may differ significantly, for instance by 16 dB or more. This could lead to difficulties in designing hardware to receive those transmissions when they use adjacent resource elements, due to signal leakage between resource elements.

One solution to the above mentioned problems of control overhead and ePDCCH reception from different transmission points is to ensure that any given ePDCCH is mapped to only a subset of the K_ePDCCH configured PRB pairs. For example, these K_ePDCCH PRB pairs could be divided into PRB pair groups of at most four PRB pairs each, where any given ePDCCH is confined to one of these groups.

At low control signaling load, it can therefore be ensured that not all K_ePDCCH configured PRB pairs are used for ePDCCH. In this case, one or more of them can instead be used for PDSCH transmissions, thus reducing the control channel overhead. Furthermore, different transmission points can use different ones of these of these four-PRB-pair groups. (Note that the number four is a non-limiting example). Hence, a fast backhaul is not needed to coordinate the ePDCCH transmissions between transmission points, as the PRB pairs can be assigned to the different transmission points according to these groups. This can be a semi-static configuration that does not need fast backhaul between transmission points.

Having transmissions separated into PRB-pair groups allocated to transmission points also reduces the potential problems of reception-power imbalance. Note that since DMRS is used for ePDCCH demodulation, the UE is not aware that ePDCCH in a first group of PRB pairs are transmitted from one transmission point while a second group is transmitted from a second transmission point. Note also that it is assumed the search space for the UE encompasses multiple groups.

In one variation of this approach, the search space for each subframe is restricted to one group of PRB pairs or a subset of the groups configured for the UE. Hence, the UE searches ePDCCH candidates in different groups, in different subframes. For instance, downlink assignments can be received in some subframes from one transmission point, using one group of PRB pairs, while uplink grants are received in another subframe, from another transmission point, using a different group of PRB pairs. This totally removes the need for reception of ePDCCH of large transmission power differences in one and the same subframe, which is a benefit that could simplify hardware implementation and cost.

Figure 21:
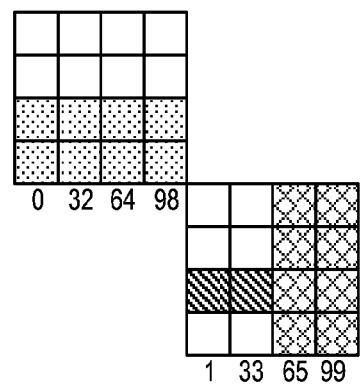
FIG. 21 is another representation of a search space, where the PRB pairs in the search space are divided into two groups.

An example of the approach described above, in which the PRB pairs are divided into groups, is illustrated in FIG. 21, which shows a series of matrices containing the search space for a UE. In this example, each 4×4 square of CCEs corresponds to one group of PRB pairs. Here, PRB pair number {0, 32, 64, 98} belongs to PRB pair group 1 and {1, 33, 65, 99} belong to group 2. Each PRB pair has four CCEs in this example. An AL=8 transmission is shown in group 1 (using CCEs shown with shading), mapped predominantly in the horizontal direction. This AL=8 transmission uses two CCEs per PRB pair, and spans four PRB pairs. Hence, the AL=8 transmission is distributed, but is confined within one PRB pair group. Furthermore, Group 2 in this example is used for an AL=8 localized transmission (mapped predominantly vertically) and an AL=2 distributed transmission (mapped horizontally).

Note that if only the ePDCCH shown in Group 1 is transmitted in the subframe, then all the PRB pairs of group 2 are unused and can thus be used for PDSCH transmissions. This is not possible if an AL=8 ePDCCH transmission spans all 8 PRB pairs (i.e., using one CCE/PRB pair) as is the case in the example shown in FIG. 19. Furthermore, when combined with the flexible eREG/CCE-to-antenna associations described earlier, two-fold antenna diversity can be achieved within each PRB pair (actually within each CCE). Accordingly, the AL=8 transmission shown in FIG. 21 achieves a total of eighth-order diversity.

Figure 22:
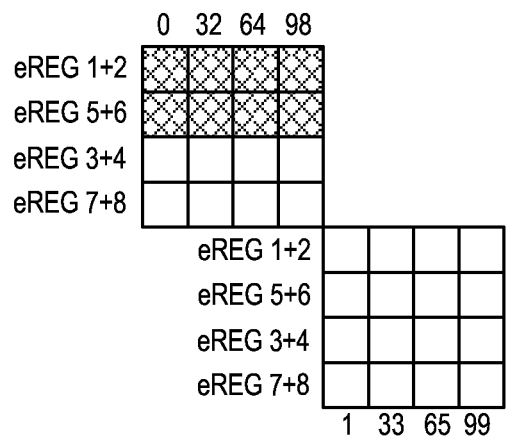
FIGS. 22-26 illustrate other examples of two-group search spaces.

The antenna diversity can, in the AL=8 case, be further increased if the two CCEs in each PRB pair are taken from the upper and lower subsets of 4 eREGs, as shown in FIGS. 16-18, since these subsets use different antenna ports. For instance the first CCE in one of the PRB pairs shown in FIG. 21 may use eREGs 1 and 2, which are mapped to antenna ports 7 and 8, respectively, while the second CCE in that same PRB pair uses eREGs 5 and 6, mapped to antenna ports 9 and 10. In this manner, fourth-order diversity can be obtained within a PRB pair, resulting in 16th-order diversity for an AL=8 ePDCCH in total. FIG. 22 illustrates an example of this approach, where CCEs (eREG groups) are interlaced within each PRB pair to ensure that an AL=8 ePDCCH (shown with crosshatching) is mapped to eREGs that use different antenna ports, so that fourth order antenna diversity is obtained within each PRB pair.

Figure 23:
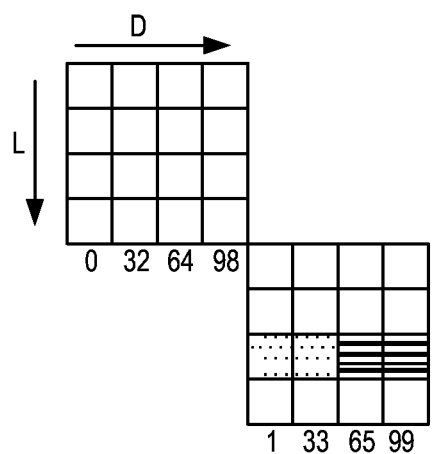

In the arrangements shown in FIGS. 21 and 22, the PRB pairs within a given group are arranged in increasing order according to their indices, and are thus arranged according to increasing frequency. (Of course, it would also be possible to arrange them in the reverse order.) The PRBs are also assigned to the groups in an interlaced fashion, so that, for example, PRB pair 0 is in group 1, while PRB pair 1 is in group 2. This has the advantage that two adjacent CCEs in the horizontal direction within a given group have a large PRB spacing, and better frequency diversity is thus obtained for the diversity mapping. An example is the AL=2 mapping in FIG. 21, where PRB pairs {1, 33} are used. In a variation of this approach, the order of the PRB pairs within each group is further re-arranged to achieve even larger frequency diversity, which can be useful in flat channels and/or when the total bandwidth is small. An example of this is seen in FIG. 23, where two AL=2 ePDCCH transmissions use PRB pairs {0, 64} and {32, 98}, respectively.

Figure 24:
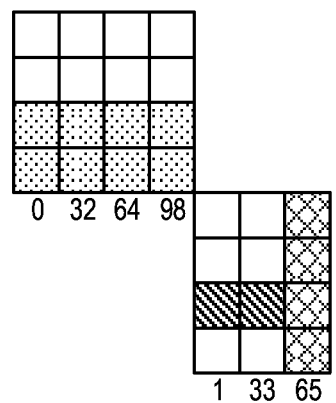

In a further variant, the number of PRB pairs per group may be different. Furthermore some groups may contain only localized transmission, while others may contain both localized and distributed transmission. An example is given in FIG. 24, where the second group only has three PRB pairs and can be used for localized transmission and/or distributed transmission. Distributed transmission, of course, is limited to AL=2, in this example. Localized transmission of up to AL=8 can be achieved in this example, and in any of the previous examples, by mapping the ePDCCH to two PRB pairs, since one PRB pair can encompass only 4 CCE.

Following is a detailed description of a fourth embodiment, which can be combined with any or all of the previous approaches or used independently thereof. When the PRB pair used for ePDCCH transmissions collides with transmissions of CRS, CSI-RS, PSS, SSS, PBCH or PRS, then puncturing of the ePDCCH may occur, such that the REs used to carry these collidingsignals are not available for ePDCCH mapping. Furthermore, the beginning OFDM symbol to be used for carrying ePDCCH in a given subframe could be configured to be different from the first OFDM symbol in the subframe, since the first n=1, 2, 3, or 4 OFDM symbols contain the legacy control channels (PDCCH, PHICH and PCFICH). In both cases, REs are effectively removed from the eREGs, and the actual number of available REs that can be used for mapping and transmission of the modulated ePDCCH symbols in an ePDCCH is smaller than in the nominal, non-punctured case. (Note that the nominal, non-punctured case only exists on new carrier types without CRS or legacy control regions). To maintain a consistent level of performance, this puncturing must be compensated for with link adaptation, by adjusting the aggregation level for the transmitted ePDCCH. Since the level of puncturing may depend on the subframe number, a given ePDCCH may require different aggregation levels in different subframes, even where the DCI payload and channel conditions are the same.

Due to this puncturing, the set of available aggregation levels {1, 2, 4, 8} permitted in Release 8 of the LTE specifications may not be sufficient to provide adequate link adaptation. For instance, if 50% of the REs used for ePDCCH are punctured in a given subframe, then using AL=8 is effectively an AL=4 transmission. This effective reduction in aggregation level reduces the coverage of the ePDCCH, which is a problem.

Figure 25:
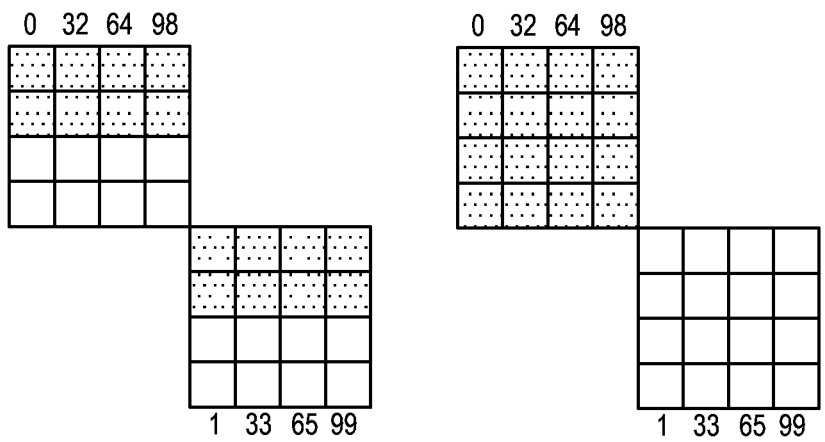

According to the fourth embodiment detailed here, the set of available aggregation levels depends on the level of puncturing in the subframe, and is known to the eNB and UE. Note that the level of puncturing may vary from one subframe to another, and thus the available AL set also depends on the subframe in this case. In one example, when there is 50% puncturing then the set of AL is {2, 4, 8, 16}. An aggregation level of AL=16 can be achieved by either increasing the number of CCEs used per PRB pair, or by using more PRB pairs. FIG. 25 illustrates two examples, each of which is based on the same two groups of PRB pairs that were shown in FIG. 21. The left-hand side of FIG. 25 shows an example where AL=16 is achieved by using more PRB pairs, including PRB pairs from both groups. The right-hand side of FIG. 25 shows an example in which AL=16 is instead achieved by increasing the number of CCE used per PRB pair.

Figure 26:
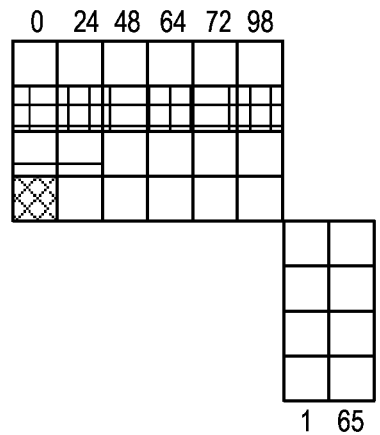

In the event that the level of puncturing is less than 50% for a given subframe, for example, then a different set of aggregation levels is available according to this approach. For instance, the set of available aggregation levels in this case could be { 1, 2, 6, 12}. The number of PRB pairs within a group might also be increased, as seen in the example shown in FIG. 26. In this example, with less than 50% puncturing, where AL=12 is the maximal required AL, then six PRB pairs can be configured for group 1, with four CCEs per PRB pair. Aggregation levels {1, 2, 3, 6, 12} can be readily accommodated in this arrangement. In this example, group 2 might be used for localized transmission only, and/or for distributed transmissions of AL={1, 2}.

According to this technique, then, the aggregation levels available for forming ePDCCH's may vary from subframe to subframe, based on the puncturing level within the subframe. It will be appreciated that this technique is not limited in its application to the particular arrangement and definitions of eREGs and CCEs used above, but may be applied to other arrangements as well. Furthermore, the sets of aggregation levels and the threshold level of 50% used above are merely examples; other sets may be used, particularly if the number of REs and/or eREGs per CCE varies from what is assumed in the preceding examples.

Figure 27:
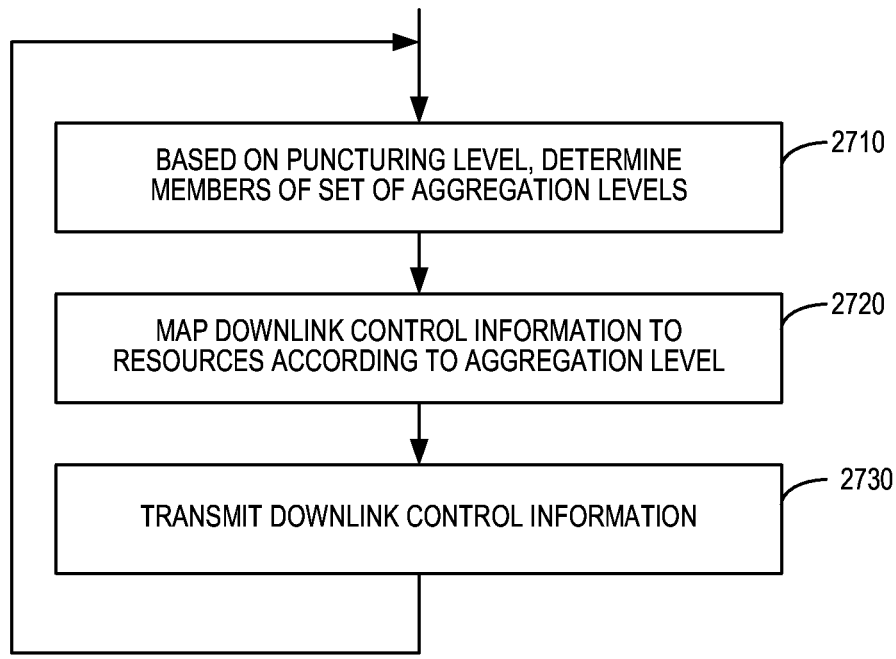
FIG. 27 is a process flow diagram illustrating an example method for transmitting control information.

FIG. 27 is a process flow diagram illustrating an example method according to this fourth embodiment, as implemented at a transmitting end of a link, e.g., at an eNB in an LTE wireless system. The illustrated method for transmitting control information is iterated for each of several subframes in which a plurality of non-overlapping subsets of resource elements, e.g., eREGs or eCCES, in at least one block of time-frequency resources, e.g., a PRB pair, are to be aggregated for transmitting the downlink control information.

As shown at block 2710, the illustrated method begins with determining members of a set of aggregation levels usable to aggregate the non-overlapping subsets of resource elements for transmitting downlink control information. This determining is based on a puncturing level to be used for the transmission of the downlink control information. Thus, for example, a first set of aggregation levels may be usable when the puncturing level is less than 50%, while a second set of aggregation levels is usable when the puncturing level is greater than or equal to 50%. As suggested by the detailed examples given above, these sets may overlap in some cases, in that several aggregation levels are found in both sets. In other embodiments, however, these sets may be completely disjoint.

As shown at block 2720, downlink control information for the given subframe is mapped to one or more non-overlapping subsets of resource elements in the at least one block of time-frequency resources, according to an aggregation level selected from the determined set. As shown at block 2730, the downlink control information for the given subframe is then transmitted, in the one or more non-overlapping subsets. As indicated by the detailed examples above, the non-overlapping subsets of resource elements may be CCEs, eCCEs, and/or eREGs, in some embodiments, but other groupings or names for groupings may be used.

As can be seen in FIG. 27, the illustrated method is repeated, for each of several subframes. As noted above, the puncturing may differ from one subframe to another. Accordingly, the set of aggregation levels usable in one subframe may differ from the set of aggregation levels usable in the next subframe, depending on the puncturing level that exists in the next subframe.

As suggested above, in some embodiments the puncturing level to be used for the transmission of the downlink control information in a given subframe depends on a number of reference signals to be transmitted in the at least one block of time-frequency resources in the subframe. The puncturing level may instead or also depend on a number of Orthogonal Frequency-Division Multiplexing (OFDM) symbols reserved exclusively for control information in the at least one block of time-frequency resources.

Figure 28:
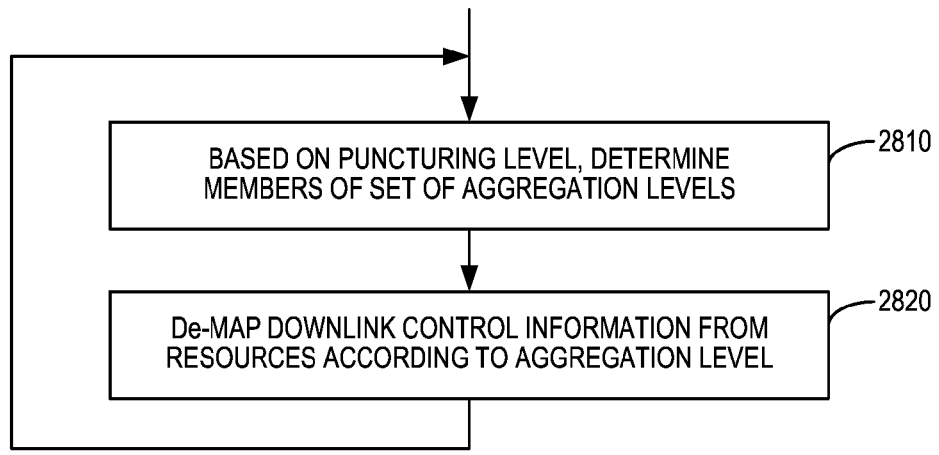
FIG. 28 is a process flow diagram illustrating an example method for receiving control information.

FIG. 28 illustrates a corresponding method for receiving downlink control information in a radio communication system, i.e., as implemented by a receiving node at the opposite end of a radio link from a node implementing the method shown in FIG. 27. As was the case for FIG. 28, the illustrated method is iterated for each of several subframes in which a plurality of non-overlapping subsets of resource elements, e.g., eREGs or eCCES, in at least one block of time-frequency resources, e.g., a PRB pair, are aggregated for a received transmission of the downlink control information.

As shown at block 2810, the illustrated method begins with determining members of a set of aggregation levels usable to aggregate the non-overlapping subsets of resource elements for the received transmission of the downlink control information. As was the case above, this determining is based on a puncturing level to be used for the received transmission of the first downlink control information, and uses the same rule or rules used by the transmitting end of the link. As shown at block 2820, downlink control information is received by de-mapping the downlink control information from one or more non-overlapping subsets of resource elements in the at least one block of time-frequency resources, according to an aggregation level selected from the determined set.

As noted earlier, the puncturing to be used for transmissions of the ePDCCH may vary from one subframe to another. Accordingly, in some embodiments of the illustrated method, the iteration of the operations shown in FIG. 28 as described above are followed by a second iteration, for a second subframe, in which members of a second set of aggregation levels are determined, based on a puncturing level to be used for a received transmission of second downlink control information in the second subframe, wherein the second set of aggregation levels differs from the first set. The second downlink control information is then received by de-mapping the second downlink control information from one or more second non-overlapping subsets of resource elements in the at least one block of time-frequency resources, according to an aggregation level selected from the determined second set.

As was the case with the process illustrated in FIG. 27, the puncturing level to be used for the received transmissions may depend on a number of reference signals in the at least one block of time-frequency resources in each subframe, in some embodiments. In these or in other embodiments, the puncturing level may depend on a number of OFDM symbols reserved exclusively for control information in the at least one block of time-frequency resources.

Any of the techniques discussed above may be combined with a fifth embodiment, which is detailed here. Since the common search space (CSS) is read by many or all UEs in the cell, it is a problem how to configure the PRB pairs for ePDCCH transmissions so that the UEs monitor the same CCEs for the common search space. Furthermore, monitoring of CSS in the ePDCCH may be UE-specifically configured, as some but not all UEs may monitor CSS in the PDCCH. Hence, it is beneficial if the CSS uses separate PRB pair resources than the UE-specific search space. Note that this also allows transmission of CSS from a different transmission point (macro) using ePDCCH than the UE-specific search space, which could be transmitted from a pico or low power node. (See the third embodiment discussed above.)

These problems can be addressed by, for example, assigning one group of PRB pairs to be a primary group, which is defined as primary since it contains the CSS. This primary group is configured to include the same PRB pairs for all UEs that receive the same CSS in the cell. Additional secondary groups can then by configured more flexibly and so that they are specific to one UE or a subset of UEs in the cell. This is useful to provide interference coordination among cells and transmission points for the UE-specific search space (USS), while maintaining macro coverage for the CSS.

Furthermore, an identification of the PRB pairs used for the primary group (e.g., the PRB indices and the number of PRB pairs, which may depend on the amount of puncturing according to the embodiment discussed above), can be signaled using Radio Resource Control (RRC) signaling, or can be signaled using previously unassigned bits in the PBCH message. The use of RRC signaling can be used at handover between cells, or when configuring an additional non-backward compatible carrier type. In this case, a configuration message received on the primary cell indicates the PRB pairs used for the primary group of an additional non-backward compatible new carrier type.

Note that is also possible to use the PBCH to indicate the location and size of the primary group of PRB pairs containing the CSS. This is particularly useful when a stand-alone carrier is used, where initial access to a carrier that does not have PDCCH transmissions is performed.

Finally, note that all of the embodiments described above for ePDCCH transmissions in above can also be applied to HARQ-ACK/NACK transmissions in response to uplink PUSCH transmissions. This can be denoted an enhanced PHICH (ePHICH) transmission.

Figure 29:
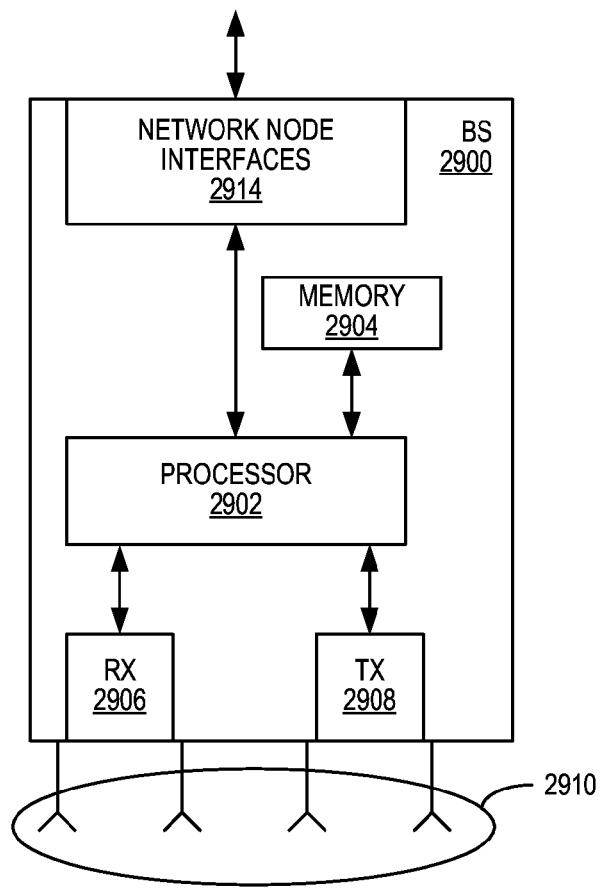
FIG. 29 is a block diagram of an example base station adapted to carry out one or more of the techniques described herein.

As noted above, e.g., in connection with describing the process flows of FIGS. 27 and 28, the various methods described herein can be performed by base stations and mobile terminals (e.g., LTE UEs). FIG. 29 is a block diagram that illustrates relevant components of a generalized base station adapted to carry out one or more of these methods, such as a method according to the process flow of FIG. 27. As seen in FIG. 29, base station 2900 can include one or more processors 2902, which control operation of other elements of the base station 2900, e.g., by running software or applications stored in one or more memory devices represented by memory unit 2904. The base station 2900 will also typically include one or more receiver chains (RX) 2906 and transmit chains (TX) 2908 (collectively, one or more transceivers) adapted to receive and transmit radio signals, respectively, over an air interface 2912, via one or more antennas 2910. These radio signals include, for example, the downlink control signals as described above.

In addition to circuitry for transmitting and receiving over the air interface, for communicating with UEs, base station 2900 typically also include other network node interfaces 2914, e.g., an S1 interface adapted for communications with a Mobility Management Entity (MME) and a Serving Gateway (SGW), and an X2 interface adapted for communications with other base stations. These interfaces can be implemented in hardware or a combination of hardware and software.

Figure 30:
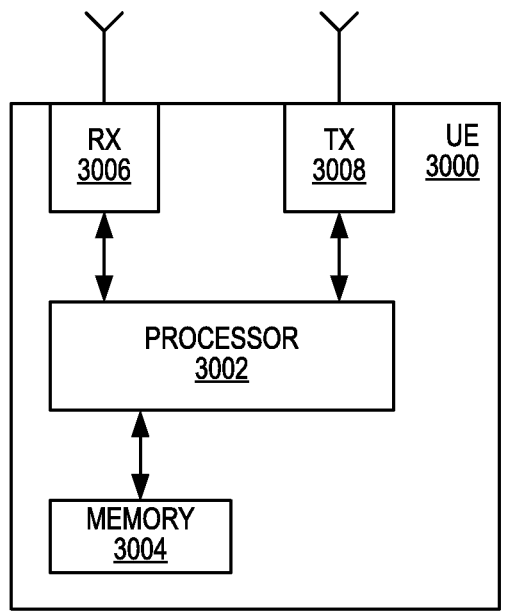
FIG. 30 is a block diagram of an example user equipment (UE) adapted to carry out one or more of the techniques described herein.

Many of the techniques described and illustrated above also impact the operation of mobile terminals (UEs) that receive downlink control signaling from the base station. For instance, the manner in which the UE processes such downlink control signaling, searches for such downlink control signaling, and/or receives information associated with such processing or searching is affected by the techniques. An exemplary UE, adapted to carry out one or more of the techniques detailed above is shown in FIG. 30. As seen in the figure, UE 3000 includes a processor 3002 connected to a memory unit 3004, which may store applications, programs or software for execution by the processor 3002. The processor 3002 may be configured to operate, in conjunction with one or more receive chains (RX) 3006, to receive downlink control signals and/or associated information as described above. The UE 3000 also includes one or more transmit chains 3008 (TX), which collectively of the RX unit(s) may be referred to as "transceiver(s)". The UE 3000 also includes one or more antennas 3010 which can be used by the RX and/or TX units to receive/transmit radio signals.

The method steps performed by the base station and/or UE, such as the method steps illustrated in FIGS. 27 and 28, respectively, are performed by functional elements of the processing circuitry. In some embodiments these functions are carried out by appropriately programmed microprocessors or microcontrollers, alone or in conjunction with other digital hardware, which may include digital signal processors (DSPs), special-purpose digital logic, and the like. Either or both of the microprocessors and digital hardware may be configured to execute program code stored in memory. Again, because the various details and engineering tradeoffs associated with the design of baseband (and other) processing circuitry for wireless base stations are well known and are unnecessary to a full understanding of the invention, additional details are not shown here.

Program code stored in the memory circuit may comprise one or several types of memory such as read-only memory (ROM), random-access memory, cache memory, flash memory devices, optical storage devices, etc., and includes program instructions for executing one or more telecommunications and/or data communications protocols, as well as instructions for carrying out one or more of the techniques described herein, in several embodiments. Of course, it will be appreciated that not all of the steps of these techniques are necessarily performed in a single microprocessor or even in a single module.

The above described embodiments can provide one or more of the following advantages. First, these techniques can be used to reduce control channel overhead when ePDCCH is used. Second, several of the embodiments may be employed to facilitate the reception of ePDCCH from different transmission points in a transparent manner, and/or to facilitate relatively slow backhaul coordination between transmission points used for different ePDCCH transmissions to the same UE. Further, several of the techniques enable a flexible adaptation of different degrees of ePDCCH puncturing in different subframes, by the use of aggregation level set adaptation Still others enable a flexible use of a CCE for either UE-specific or diversity transmission.

Figure 31:
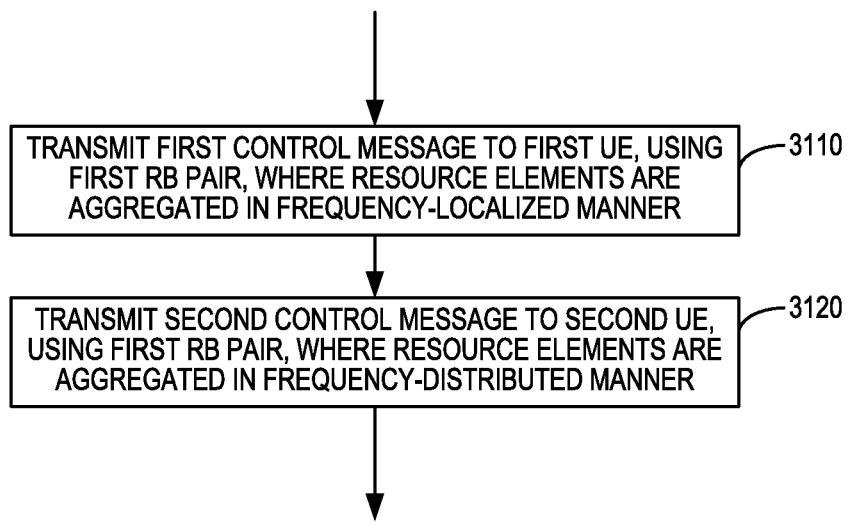
FIG. 31 is a process flow diagram illustrating another example method for transmitting control information.

One consequence of this last advantage is that the resources in a single PRB pair can be used by the base station for both frequency-localized transmissions as well as distributed transmissions. FIG. 31 is a process flow diagram illustrating an example method according to this approach, as might be implemented in a base station like the one pictured in FIG. 28. As shown at block 3110 of FIG. 31, the illustrated method for transmitting downlink control information in a radio communication system begins with transmitting a first control message to a first UE, using a first PRB pair. This first control message is divided among two or more first non-overlapping subsets of resource elements, at least one of which is in the first PRB pair, where the two or more first non-overlapping subsets of resource elements are aggregated in a frequency-localized manner within at least the first PRB pair. Symbols in these two or more first non-overlapping subsets of resource elements are transmitted using a single antenna port. As shown at block 3120, the base station also transmits a second control message to a second UE, also using the first PRB pair. The second control message is also divided among two or more second non-overlapping subsets of resource elements, at least one of which is in the first PRB pair. In this case, however, the two or more second non-overlapping subsets of resource elements are aggregated in a frequency-distributed manner across the first PRB pair and one or more additional PRB pairs, and symbols in at least two of the two or more second non-overlapping subsets of resource elements are transmitted using differing antenna ports, these differing antenna ports including the single antenna port used to transmit the symbols in the two or more first non-overlapping subsets of resource elements. It will be appreciated that each of the non-overlapping subsets of resources may define an enhanced REG (eREG) in a Long-Term Evolution (LTE) network, in some embodiments, although other groupings or names for groupings may be used.

The present invention may, of course, be carried out in other ways and in other combinations than those specifically set forth herein without departing from essential characteristics of the invention. The present embodiments are to be considered in all respects as illustrative and not restrictive. With these and other variations and extensions in mind, those skilled in the art will appreciate that the foregoing description and the accompanying drawings represent non-limiting examples of the systems and apparatus taught herein for facilitating load balancing in a data packet network. As such, the present invention is not limited by the foregoing description and accompanying drawings. Instead, the present invention is limited only by the following claims and their legal equivalents.

What is claimed is:

1. A method for transmitting downlink control information in a radio communication system, the method comprising, for a first subframe in which a plurality of non-overlapping subsets of resource elements in at least one block of time-frequency resources are to be aggregated for transmitting the downlink control information:
   determining members of a first set of aggregation levels usable to aggregate the non-overlapping subsets of resource elements for transmitting first downlink control information, wherein said determining is based on a puncturing level to be used for the transmission of the first downlink control information;
   mapping the first downlink control information to one or more first non-overlapping subsets of resource elements in the at least one block of time-frequency resources, according to an aggregation level selected from the determined first set; and
   transmitting the first downlink control information in the one or more first non-overlapping subsets.

2. The method of claim 1, further comprising, for a second subframe:
   determining members of a second set of aggregation levels, based on a puncturing level to be used for the transmission of the second downlink control information, wherein the second set differs from the first set;
   mapping the second downlink control information to one or more second non-overlapping subsets of resource elements in the at least one block of time-frequency resources, according to an aggregation level selected from the determined second set; and
   transmitting the second downlink control information in the one or more second non-overlapping subsets.

3. The method of claim 1, wherein the puncturing level to be used for the transmission of the first downlink control information depends on a number of reference signals to be transmitted in the at least one block of time-frequency resources in the first subframe.

4. The method of claim 1, wherein the puncturing level to be used for the transmission of the first downlink control information depends on a number of Orthogonal Frequency-Division Multiplexing (OFDM) symbols reserved exclusively for control information in the at least one block of time-frequency resources.

5. The method of claim 1, wherein the at least one block of time-frequency resources is a Physical Resource Block (PRB) pair in a Long-Term Evolution (LTE) network.

6. The method of claim 1, wherein a non-overlapping subset of resources defines an enhanced CCE (eCCE) in a Long-Term Evolution (LTE) network.

7. A method for receiving downlink control information in a radio communication system, the method comprising, for a first subframe in which a plurality of non-overlapping subsets of resource elements in at least one block of time-frequency resources are to be aggregated for a received transmission of first downlink control information:
   determining members of a first set of aggregation levels usable to aggregate the non-overlapping subsets of resource elements for the received transmission of the first downlink control information, wherein said determining is based on a puncturing level to be used for the received transmission of the first downlink control information; and
   receiving the first downlink control information by de-mapping the first downlink control information from one or more first non-overlapping subsets of resource elements in the at least one block of time-frequency resources, according to an aggregation level selected from the determined first set.

8. The method of claim 7, further comprising, for a second subframe:
   determining members of a second set of aggregation levels, based on a puncturing level to be used for a received transmission of second downlink control information, wherein the second set differs from the first set; and
   receiving the second downlink control information by de-mapping the second downlink control information from one or more second non-overlapping subsets of resource elements in the at least one block of time-frequency resources, according to an aggregation level selected from the determined second set.

9. The method of claim 7, wherein the puncturing level to be used for the received transmission of the first downlink control information depends on a number of reference signals in the at least one block of time-frequency resources in the first subframe.

10. The method of claim 7, wherein the puncturing level to be used for the received transmission of the first downlink control information depends on a number of Orthogonal Frequency-Division Multiplexing (OFDM) symbols reserved exclusively for control information in the at least one block of time-frequency resources.

11. The method of claim 7, wherein the at least one block of time-frequency resources is a Physical Resource Block (PRB) pair in a Long-Term Evolution (LTE) network.

12. A base station apparatus arranged to transmit downlink control information in a radio communication system, the base station apparatus comprising:
   transmitter circuits and receiver circuits adapted to receive and transmit radio signals over an air interface; and
   one or more processing circuits adapted, for a first subframe in which a plurality of non-overlapping subsets of resource elements in at least one block of time-frequency resources are to be aggregated for transmitting the downlink control information, to:
      determine members of a first set of aggregation levels usable to aggregate the non-overlapping subsets of resource elements for transmitting first downlink control information, wherein said determining is based on a puncturing level to be used for the transmission of the first downlink control information;
      map the first downlink control information to one or more first non-overlapping subsets of resource elements in the at least one block of time-frequency resources, according to an aggregation level selected from the determined first set; and
      transmit the first downlink control information in the one or more first non-overlapping subsets, using the transmitter circuits.

13. The base station apparatus of claim 12, wherein the processing circuits are further adapted to, for a second subframe:
   determine members of a second set of aggregation levels, based on a puncturing level to be used for the transmission of the second downlink control information, wherein the second set differs from the first set;

map the second downlink control information to one or more second non-overlapping subsets of resource elements in the at least one block of time-frequency resources, according to an aggregation level selected from the determined second set; and transmit the second downlink control information in the one or more second non-overlapping subsets.

14. The base station apparatus of claim 12, wherein the puncturing level to be used for the transmission of the first downlink control information depends on a number of reference signals to be transmitted in the at least one block of time-frequency resources in the first subframe.

15. The base station apparatus of claim 12, wherein the puncturing level to be used for the transmission of the first downlink control information depends on a number of Orthogonal Frequency-Division Multiplexing (OFDM) symbols reserved exclusively for control information in the at least one block of time-frequency resources.

16. The base station apparatus of claim 12, wherein the at least one block of time-frequency resources is a Physical Resource Block (PRB) pair in a Long-Term Evolution (LTE) network.

17. A user equipment apparatus arranged to receive downlink control information in a radio communication system, the user equipment apparatus comprising transmitter circuits and receiver circuits adapted to receive and transmit radio signals over an air interface, and one or more processing adapted to, for a first subframe in which a plurality of non-overlapping subsets of resource elements in at least one block of time-frequency resources are to be aggregated for a received transmission of first downlink control information:

determine members of a first set of aggregation levels usable to aggregate the non-overlapping subsets of resource elements for the received transmission of the first downlink control information, wherein said determining is based on a puncturing level to be used for the received transmission of the first downlink control information; and receive the first downlink control information by de-mapping the first downlink control information from one or more first non-overlapping subsets of resource elements in the at least one block of time-frequency resources, according to an aggregation level selected from the determined first set.

18. The user equipment of claim 17, wherein the one or more processing circuits are further adapted to, for a second subframe:

determine members of a second set of aggregation levels, based on a puncturing level to be used for a received transmission of second downlink control information, wherein the second set differs from the first set; and receive the second downlink control information by de-mapping the second downlink control information from one or more second non-overlapping subsets of resource elements in the at least one block of time-frequency resources, according to an aggregation level selected from the determined second set.

19. The user equipment apparatus of claim 17, wherein the puncturing level to be used for the received transmission of the first downlink control information depends on a number of reference signals in the at least one block of time-frequency resources in the first subframe.

20. The user equipment apparatus of claim 17, wherein the puncturing level to be used for the received transmission of the first downlink control information depends on a number of Orthogonal Frequency-Division Multiplexing (OFDM) symbols reserved exclusively for control information in the at least one block of time-frequency resources.

21. The user equipment apparatus of claim 17, wherein the at least one block of time-frequency resources is a Physical Resource Block (PRB) pair in a Long-Term Evolution (LTE) network.

* * * * *

UNITED STATES PATENT AND TRADEMARK OFFICE
CERTIFICATE OF CORRECTION

PATENT NO. : 9,161,344 B2
APPLICATION NO. : 13/885704
DATED : October 13, 2015
INVENTOR(S) : Frenne et al.

It is certified that error appears in the above-identified patent and that said Letters Patent is hereby corrected as shown below:

In the claims,

Column 27, line 29 (claim 17, line 6) please change "one or more processing adapted to" to -- "one or more processing circuits adapted to" --

Signed and Sealed this
Twenty-second Day of March, 2016

Michelle K. Lee
*Director of the United States Patent and Trademark Office*

UNITED STATES PATENT AND TRADEMARK OFFICE
CERTIFICATE OF CORRECTION

PATENT NO. : 9,161,344 B2
APPLICATION NO. : 13/885704
DATED : October 13, 2015
INVENTOR(S) : Frenne et al.

It is certified that error appears in the above-identified patent and that said Letters Patent is hereby corrected as shown below:

On Title Page 2, item (56), under "OTHER PUBLICATIONS", in Column 2, Line 16, delete ""Miltiplexing" and insert -- "Multiplexing --, therefor.

In the specification,

In Column 14, Line 25, delete "transmitted" and insert -- transmitted. --, therefor.

In Column 19, Line 63, delete "collidingsignals" and insert -- colliding signals --, therefor.

In Column 20, Line 53, delete "ePDCCH's" and insert -- ePDCCHs --, therefor.

In the claims,

In Column 27, Line 26, in Claim 17, delete "comprising" and insert -- comprising: --, therefor.

In Column 28, Line 9, in Claim 18, delete "The user equipment of claim" and insert -- The user equipment apparatus of claim --, therefor.

Signed and Sealed this
Second Day of August, 2016

Michelle K. Lee
*Director of the United States Patent and Trademark Office*